(12) United States Patent
Gupta et al.

(10) Patent No.: US 11,495,114 B2
(45) Date of Patent: Nov. 8, 2022

(54) ALERT SIMILARITY AND LABEL TRANSFER

(71) Applicant: SparkCognition, Inc., Austin, TX (US)

(72) Inventors: Shreya Gupta, Austin, TX (US); Kevin Gullikson, Pflugerville, TX (US)

(73) Assignee: SPARKCOGNITION, INC., Austin, TX (US)

( * ) Notice: Subject to any disclaimer, the term of this patent is extended or adjusted under 35 U.S.C. 154(b) by 78 days.

(21) Appl. No.: 17/073,739

(22) Filed: Oct. 19, 2020

(65) Prior Publication Data

US 2022/0122445 A1    Apr. 21, 2022

(51) Int. Cl.
   *G08B 21/18*    (2006.01)
   *G06V 10/75*    (2022.01)

(52) U.S. Cl.
   CPC ......... *G08B 21/187* (2013.01); *G06V 10/758* (2022.01); *G08B 21/182* (2013.01); *G08B 21/185* (2013.01)

(58) Field of Classification Search
   CPC .... G08B 21/18; G08B 31/00; G05B 23/0205; G05B 23/0224; G05B 23/0243; G05B 23/0254
   See application file for complete search history.

(56) References Cited

U.S. PATENT DOCUMENTS

| 10,921,759 B2 * | 2/2021 | Ma ..................... G05B 13/042 |
| 2017/0365155 A1 * | 12/2017 | Borutta ............... G06K 9/6247 |
| 2018/0189298 A1 * | 7/2018 | Salminen ............... G06F 17/16 |

OTHER PUBLICATIONS

Zakaria Jaadi, A Step by Step Explanation of Principal Component Analysis, Aug. 5, 2020 (Year: 2020).*

* cited by examiner

*Primary Examiner* — Benyam Haile
(74) *Attorney, Agent, or Firm* — Moore IP Law

(57) ABSTRACT

A method of identifying a historical alert that is similar to an alert associated with a detected deviation from an operational state of a device includes receiving feature data including time series data for multiple sensor devices associated with the device and receiving an alert indicator for the alert. The method includes processing a portion of the feature data that is within a temporal window associated with the alert indicator to generate feature importance data for the alert. The feature importance data includes values indicating relative importance of each of the sensor devices to the alert. The method also includes identifying one or more historical alerts that are most similar, based on the feature importance data and stored feature importance data, to the alert.

21 Claims, 9 Drawing Sheets

ALERT SIMILARITY AND LABEL TRANSFER

FIELD

The present disclosure is generally related to identifying historical alerts that are similar to an alert indicating, e.g., an anomalous behavior of a device.

BACKGROUND

Equipment, such as machinery or other devices, is commonly monitored via multiple sensors that generate sensor data indicative of operation of the equipment. An anomalous operating state of the equipment may be detected via analysis of the sensor data and an alert generated to indicate the anomalous operating state. The alert and the data associated with generating the alert can be provided to a subject matter expert (SME) that attempts to diagnose the factors responsible for the anomalous operating state. Accurate and prompt diagnosis of such factors can guide effective remedial actions and result in significant cost savings for repair, replacement, labor, and equipment downtime, as compared to an incorrect diagnosis, a delayed diagnosis, or both.

Historical alert data may be accessed by the SME and compared to the present alert to guide the diagnosis and reduce troubleshooting time. For example, the SME may examine historical alert data to identify specific sets of sensor data associated with the historical alerts that have similar characteristics as the sensor data associated with the present alert. To illustrate, an SME examining an alert related to abnormal vibration and rotational speed measurements of a wind turbine may identify a previously diagnosed historical alert associated with similar values of vibration and rotational speed. The SME may use information, referred to as a "label," associated with the diagnosed historical alert (e.g., a category or classification of the historical alert, a description or characterization of underlying conditions responsible for the historical alert, remedial actions taken responsive to the historical alert, etc.) to guide the diagnosis and determine remedial action for the present alert.

Ideally, automation would be used to perform such comparisons to historical alerts and to transfer the label(s) associated with the most similar historical alert(s) to the present alert to reduce delay and increase effectiveness in diagnosing the alert. However, comparisons of sensor data to historical sensor data are affected by factors such as changes over time for measurements associated with the normal operating state of a particular machine (also referred to as an "asset"), such as due to maintenance, startups, shutdowns, and changes in external environment, differences in measurements associated with normal operating states among a group of physically different assets of the same type, changes in the environment of one or more of the assets, and changes over time for measurements associated with the normal operating state of such assets, such as due to wear, repair, or resetting of the assets.

SUMMARY

In some aspects, a method of identifying a historical alert that is similar to an alert associated with a detected deviation from an operational state of a device includes receiving feature data including time series data for multiple sensor devices associated with the device. The term "feature" is used herein to indicate a source of data indicative of operation of a device. For example, each of the multiple sensor devices measuring the asset's performance may be referred to as a feature, and each set of time series data (e.g., raw sensor data) from the multiple sensor devices may be referred to as "feature data." Additionally, or alternatively, a "feature" may represent a stream of data (e.g., "feature data") that is derived or inferred from one or more sets of raw sensor data, such as frequency transform data, moving average data, or results of computations preformed on multiple sets of raw sensor data (e.g., feature data of a "power" feature may be computed based on raw sensor data of electrical current and voltage measurements), one or more sets or subsets of other feature data, or a combination thereof, as illustrative, non-limiting examples.

The method includes receiving an alert indicator for the alert and processing a portion of the feature data that is within a temporal window associated with the alert indicator to generate feature importance data for the alert. As used herein, "feature importance data" refers to one or more values indicating a relative or absolute importance of each of the features to generation of the alert. The method also includes identifying one or more historical alerts that are most similar, based on the feature importance data and stored feature importance data, to the alert.

In some aspects, a system to identify a historical alert that is similar to an alert associated with a detected deviation from an operational state of a device includes a memory including stored feature importance data for historical alerts and one or more processors coupled to the memory. The one or more processors are configured to receive feature data including time series data for multiple sensor devices associated with the device and receive an alert indicator for the alert. The one or more processors are configured to process a portion of the feature data that is within a temporal window associated with the alert indicator to generate feature importance data for the alert, the feature importance data including values indicating relative importance of each of the sensor devices to the alert. The one or more processors are also configured to identify one or more of the historical alerts that are most similar, based on the feature importance data and the stored feature importance data, to the alert.

In some aspects, a computer-readable storage device stores instructions. The instructions, when executed by one or more processors, cause the one or more processors to receive feature data including time series data for multiple sensor devices associated with a device and to receive an alert indicator for an alert associated with a detected deviation from an operational state of the device. The instructions cause the one or more processors to process a portion of the feature data that is within a temporal window associated with the alert indicator to generate feature importance data for the alert, the feature importance data including values indicating relative importance of each of the sensor devices to the alert. The instructions also cause the one or more processors to identify one or more historical alerts that are most similar, based on the feature importance data and stored feature importance data, to the alert.

In some aspects, a method of identifying a historical alert that is similar to an alert associated with a detected deviation from an operational state of a device includes receiving feature data including time series data for multiple sensor devices associated with the device. The method includes receiving an alert indicator for the alert and processing a portion of the feature data that is within a temporal window associated with the alert indicator to generate feature importance data for the alert. The feature importance data includes values indicating relative importance of each of the sensor devices to the alert. The method also includes identifying one or more historical alerts that are most similar to the alert based on feature-by-feature processing of the values in the feature importance data with corresponding values in the stored feature importance data.

In some aspects, a system to identify a historical alert that is similar to an alert associated with a detected deviation from an operational state of a device includes a memory including stored feature importance data for historical alerts. The system also includes one or more processors coupled to the memory. The one or more processors are configured to receive feature data including time series data for multiple sensor devices associated with the device and receive an alert indicator for the alert. The one or more processors are configured to process a portion of the feature data that is within a temporal window associated with the alert indicator to generate feature importance data for the alert, the feature importance data including values indicating relative importance of each of the sensor devices to the alert. The one or more processors are also configured to identify one or more of the historical alerts that are most similar to the alert based on feature-by-feature processing of the values in the feature importance data with corresponding values in the stored feature importance data.

In some aspects, a computer-readable storage device stores instructions. The instructions, when executed by one or more processors, cause the one or more processors to receive feature data including time series data for multiple sensor devices associated with a device and to receive an alert indicator for an alert associated with a detected deviation from an operational state of the device. The instructions cause the one or more processors to process a portion of the feature data that is within a temporal window associated with the alert indicator to generate feature importance data for the alert, the feature importance data including values indicating relative importance of each of the sensor devices to the alert. The instructions also cause the one or more processors to identify one or more historical alerts that are most similar to the alert based on feature-by-feature processing of the values in the feature importance data with corresponding values in the stored feature importance data.

DETAILED DESCRIPTION

Figure 1:
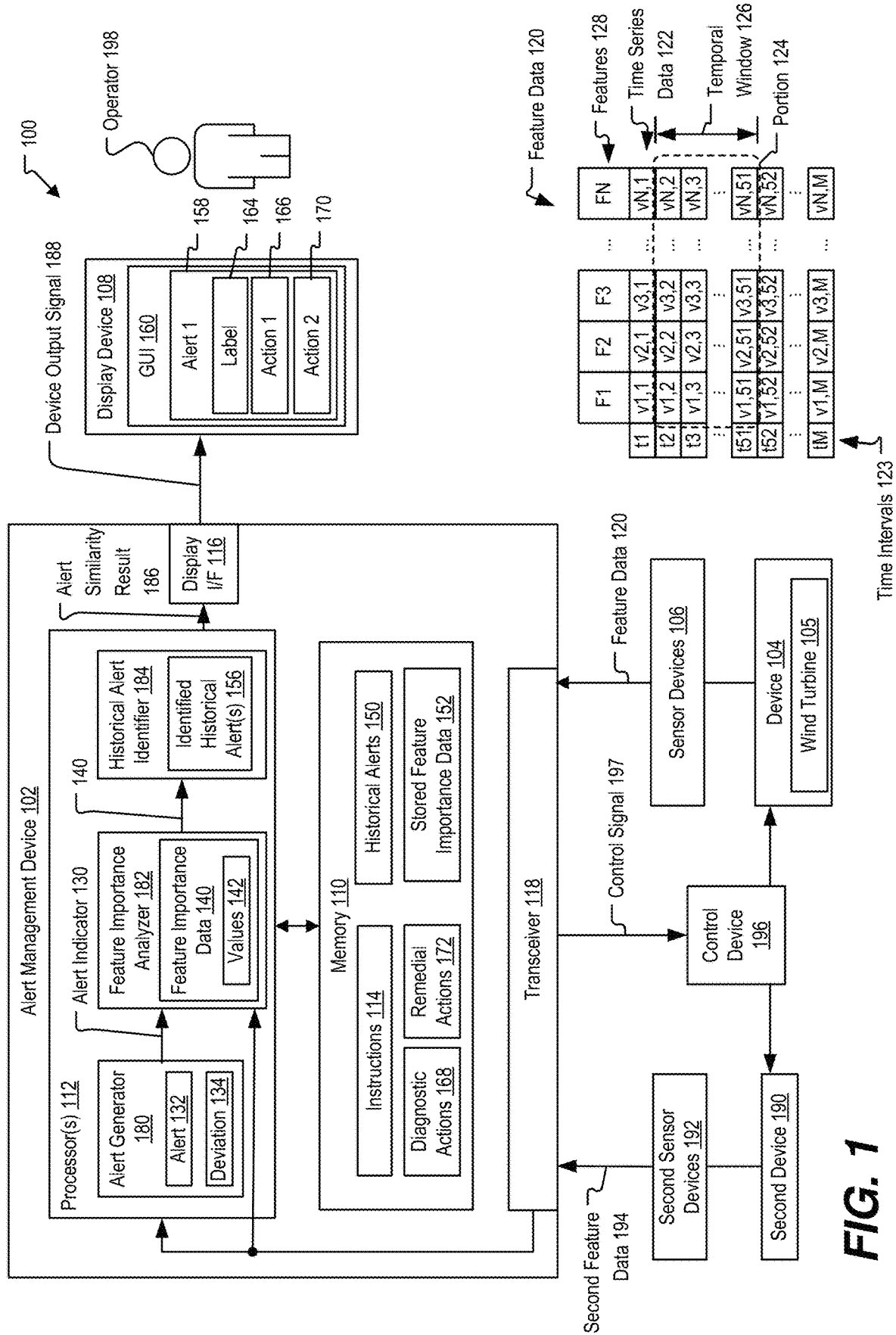
FIG. 1 illustrates a block diagram of a system configured to identify a historical alert that is similar to an alert associated with a detected deviation from an operational state of a device in accordance with some examples of the present disclosure.

Systems and methods are described that enable alert similarity and label transfer to be performed based on comparisons involving feature data of a detected alert to feature data of one or more historical alerts. Because comparisons of historical sensor data to sensor data associated with a current alert is affected by factors such as differences among a group of physically different assets of the same type, changes in the environment of one or more of the assets, as well as changes over time for measurements associated with the normal operating state of such assets, an SME can typically only establish alert similarity after meticulous examination of the current alert and past alerts, which could turn out to be even more work than individually diagnosing the alert using raw data. As a result, troubleshooting an alert by an SME is difficult and time consuming. In addition, inconsistencies are introduced in the troubleshooting process because different SMEs might troubleshoot differently and with varying quality based on their expertise.

The systems and methods described herein address such difficulties by use of similarity metrics to label alerts based on feature importance values (e.g., values indicating how important each feature is to the generation of a particular alert). To illustrate, if two alerts are similar, meaning that the alerts have similar distributional properties with respect to their respective normals, then their feature importance values will also be similar. This similarity of feature importance data for similar alerts is largely unaffected by changes in raw sensor data that may occur due to repairs and system reboots and the resulting changes in sensor data distributions, as well as to the compounded problem of comparing alerts over multiple assets.

Thus, the described systems and methods enable relatively inexpensive transfer learning of alert labels over time for the same asset, and across assets, via comparing feature importance values using distance and similarity metrics. As a result, troubleshooting or evaluation of alerts may be significantly enhanced by automatically identifying similar historical alerts with enhanced accuracy as compared to analyzing raw sensor data, and with reduced delay and inconsistency as compared to examination of raw sensor data by an SME.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

FIG. 1 depicts a system 100 to identify a historical alert that is similar to an alert 132 associated with a detected deviation 134 from an operational state of a device 104, such as a wind turbine 105. The system 100 includes an alert management device 102 that is coupled to sensor devices 106 that monitor operation of the device 104. The alert management device 102 is also coupled to second sensor devices 192 that monitor a second device 190 and to a control device 196. A display device 108 is coupled to the alert management device 102 and is configured to provide data indicative of the alert 132 to an operator 198, such as an SME.

The alert management device 102 includes a memory 110 coupled to one or more processors 112. The one or more processors 112 are further coupled to a transceiver 118 and to a display interface (I/F) 116. The transceiver 118 is configured to receive feature data 120 from the one or more sensor devices 106 and to provide the feature data 120 to the one or more processors 112 for further processing. In an example, the transceiver 118 includes a bus interface, a wireline network interface, a wireless network interface, or one or more other interfaces or circuits configured to receive the feature data 120 via wireless transmission, via wireline transmission, or any combination thereof. The transceiver 118 is further configured to receive second feature data 194 from the second sensor devices 192 and to send a control signal 197 to the control device 196, as explained further below.

In some implementations, the memory 110 includes volatile memory devices, non-volatile memory devices, or both, such as one or more hard drives, solid-state storage devices (e.g., flash memory, magnetic memory, or phase change memory), a random access memory (RAM), a read-only memory (ROM), one or more other types of storage devices, or any combination thereof. The memory 110 stores data and instructions 114 (e.g., computer code) that are executable by the one or more processors 112. For example, the instructions 114 are executable by the one or more processors 112 to initiate, perform, or control various operations of the alert management device 102.

As illustrated, the memory 110 includes the instructions 114, an indication of one or more diagnostic actions 168, an indication of one or more remedial actions 172, and stored feature importance data 152 for historical alerts 150. As used herein, "historical alerts" are alerts that have previously been detected and recorded, such as stored in the memory 110 for later access by the one or more processors 112. In some implementations, at least one of the historical alerts 150 corresponds to a previous alert for the device 104. For example, the historical alerts 150 include a history of alerts for the particular device 104. In some implementations in which the alert management device 102 manages alerts for multiple assets, illustrated as the device 104 and the second device 190, the historical alerts 150 also include a history of alerts for the second device 190. The instructions 114 are executable by the one or more processors 112 to perform the operations described in conjunction with the one or more processors 112.

The one or more processors 112 include one or more single-core or multi-core processing units, one or more digital signal processors (DSPs), one or more graphics processing units (GPUs), or any combination thereof. The one or more processors 112 are configured to access data and instructions from the memory 110 and to perform various operations associated with comparisons, of the alert 132 and data associated with the alert 132, to the historical alerts 150 and feature importance data 152 associated with the historical alerts 150.

The one or more processors 112 include an alert generator 180, a feature importance analyzer 182, and a historical alert identifier 184. The alert generator 180 is configured to receive the feature data 120 and to generate the alert 132 responsive to anomalous behavior of one or more features 128 of the feature data 120. In an illustrative example, the alert generator 180 includes one or models configured to perform comparisons of the feature data 120 to short-term or long-term historical norms, to one or more thresholds, or a combination thereof, and to send an alert indicator 130 indicating the alert 132 to the feature importance analyzer 182 in response to detecting the deviation 134 from the operational state of the device 104.

The feature importance analyzer 182 is configured to receive the feature data 120 including time series data 122 for multiple sensor devices 106 associated with the device 104 and to receive the alert indicator 130 for the alert 132. The time series data 122 corresponds to multiple features 128 for multiple time intervals 123. In an illustrative example, each feature 128 of the feature data 120 corresponds to the time series data 122 for a corresponding sensor device of the multiple sensor devices 106, illustrated in FIG. 1 as a table of feature values for each of the features 128 and for each of the time intervals 123. The feature data 120 is illustrated as including the time series data 122 for N features 128 over M time intervals, where N and M are each positive integers. As an example, the value for the first feature (F1) at the third time interval (t3) is denoted as (v1,3), while the value for the Nth feature (FN) at the Mth time interval (tM) is denoted as (vN,M).

The feature importance analyzer 182 is configured to process a portion 124 of the feature data 120 that is within a temporal window 126 associated with the alert indicator 130 to generate feature importance data 140 for the alert 132. As illustrated, the alert 132 is generated upon processing the feature data 120 for time interval t51, and the temporal window 126 corresponds to the 50 time intervals that precede and include the time interval t51. Although the temporal window 126 includes 50 time intervals, in other implementations the temporal window 126 includes more than 50 time intervals or fewer than 50 time intervals.

The feature importance data 140 includes values 142 indicating relative importance of data from each of the sensor devices 106 to generation of the alert 132. In some implementations, the feature importance data 140 for each feature may be generated using the corresponding normal (e.g., mean value and deviation) for that feature, such as by using Quartile Feature Importance. In other implementations, the feature importance data 140 may be generated using another such as KDE feature importance or random forest, as non-limiting examples.

In a first illustrative, non-limiting example of determining the feature importance data 140 using quartiles, a machine learning model is trained to identify 101 percentiles (P0 through P100) of training data for each of the sensor devices 106, where percentile 0 for a particular sensor device is the minimum value from that sensor device in the training data, percentile 100 is the maximum value from that sensor device in the training data, percentile 50 is the median value from that sensor device in the training data, etc. To illustrate, the training data can be a portion of the feature data 120 from a non-alert period (e.g., normal operation) after a most recent system reset or repair. After training, a sensor value 'X' is received in the feature data 120. The feature importance score for that sensor device is calculated as the sum: abs(X−P_closest)+abs(X−P_next−closest)+ . . . +abs(X−P_kth−closest), where abs( ) indicates an absolute value operator, and where k is a tunable parameter. This calculation may be repeated for all received sensor values to determine a feature importance score for all of the sensor devices.

In a second illustrative, non-limiting example of determining the feature importance data 140 using KDE, a machine learning model is trained to fit a gaussian kernel density estimate (KDE) to the training distribution (e.g., a portion of the feature data 120 from a non-alert period (e.g., normal operation) after a most recent system reset or repair) to obtain an empirical measure of the probability distribution P of values for each of the sensor devices. After training, a sensor value 'X' is received in the feature data 120. The feature importance score for that sensor device is calculated as 1−P(X). This calculation may be repeated for all received sensor values to determine a feature importance score for all of the sensor devices.

In a third illustrative, non-limiting example of determining the feature importance data 140 using a random forest, each tree in the random forest consists of a set of nodes with decisions based on feature values, such as "feature Y<100". During training, the proportion of points reaching that node is determined, and a determination is made as to how much it decreases the impurity (e.g., if before the node there are 50/50 samples in class A vs. B, and after splitting, samples with Y<100 are all class A while samples with Y>100 are all class B, then there is a 100% decrease in impurity). The tree can calculate feature importance based on how often a given feature is involved in a node and how often that node is reached. The random forest calculates feature importances as the average value for each of the individual trees.

Figure 5:
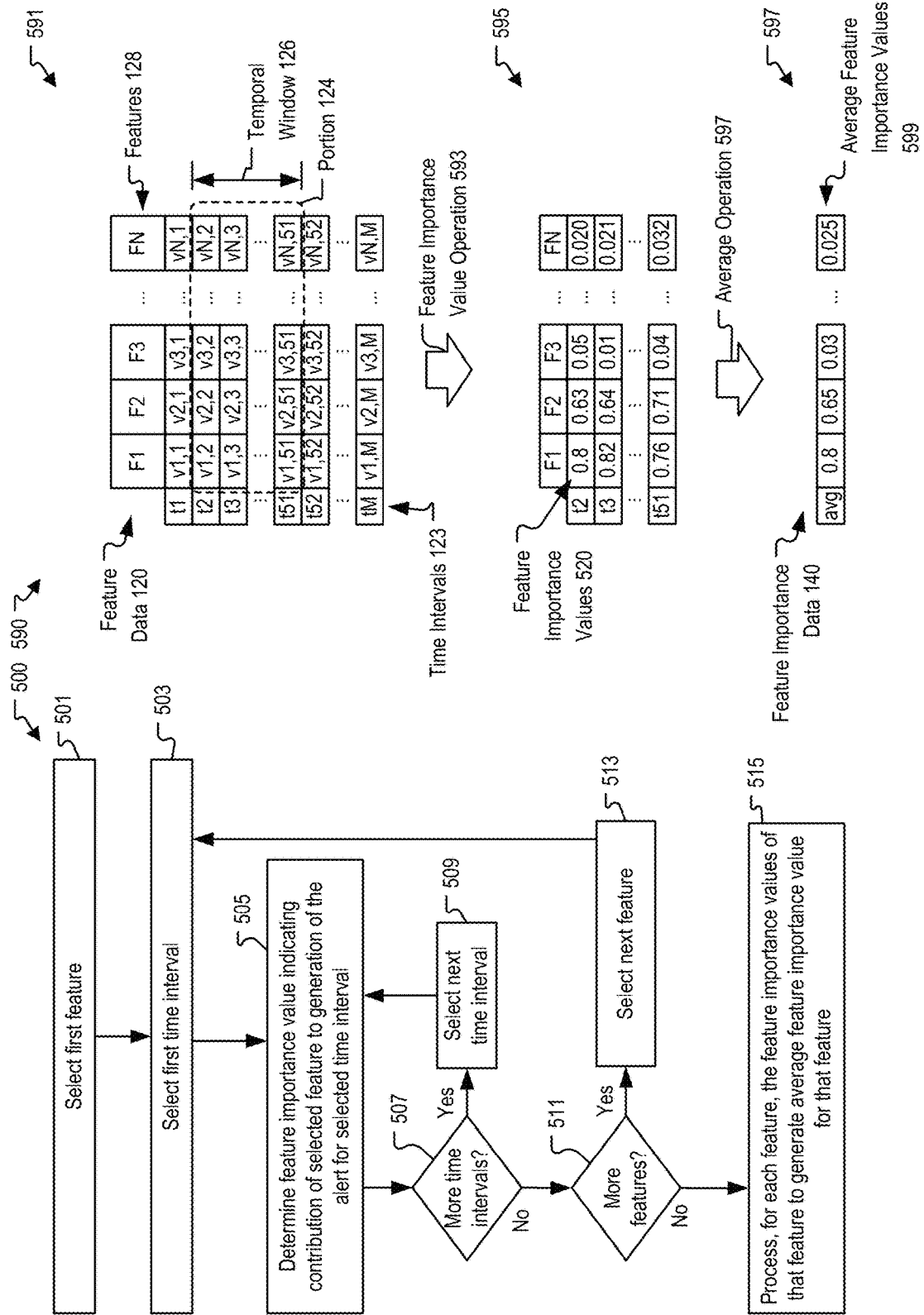
FIG. 5 illustrates a flow chart and diagrams corresponding to operations that may be performed in the system of FIG. 1 to generate feature importance data according to a particular implementation.

In some implementations, the feature importance analyzer 182 is configured to determine, for each of the features 128, a feature importance value indicating the contribution of that feature to generation of the alert 132 for each time interval within the temporal window 126 and to process, for each of the features 128, the feature importance values of that feature to generate an average feature importance value for that feature, such as described in further detail with reference to FIG. 5. In some implementations, the resulting feature importance data 140 includes, for each of the features 128, the average of the feature importance value determined for that feature.

The historical alert identifier 184 is configured to identify one or more historical alerts 156 that are most similar, based on the feature importance data 140 and the stored feature importance data 152, to the alert 132. In some implementations, the historical alert identifier 184 is configured, for each of the historical alerts 150, to determine a first set of features providing the largest contributions to generation of that historical alert, combine the first set of features with a set of features providing the largest contributions to generation of the alert 132 to identify a subset of features, and determine, for the identified subset of features, a similarity value based on feature-by-feature processing of the values 142 in the feature importance data 140 with corresponding values in the stored feature importance data corresponding to that historical alert. Examples of various techniques for identifying the most similar historical alerts are described in further detail with reference to FIGS. 2-4. The historical alert identifier 184 generates information associated with the identified one or more most similar historical alerts 156 as an alert similarity result 186 for output to the display device 108.

The display interface 116 is coupled to the one or more processors 112 and configured to provide a graphical user interface (GUI) 160 to the display device 108. For example, the display interface 116 provides the alert similarity result 186 as a device output signal 188 to be displayed via the graphical user interface 160 at the display device 108. The graphical user interface 160 includes a label 164, an indication 166 of a diagnostic action 168, an indication 170 of a remedial action 172, or a combination thereof, associated with each of the identified one or more historical alerts 156. Although a single label 164, diagnostic action 168, and remedial action 172 associated with a single historical alert 158 are depicted at the graphical user interface 160, any number of labels or actions for any number of the identified historical alerts 156 may be provided at the graphical user interface 160.

During operation, the sensor devices 106 monitor operation of the device 104 and stream or otherwise provide the feature data 120 to the alert management device 102. The feature data 120 is provided to the alert generator 180, which may apply one or more models to the feature data 120 to determine whether a deviation 134 from an expected operating state of the device 104 is detected. In response to detecting the deviation 134, the alert generator 180 generates the alert 132 and provides the alert indicator 130 to the feature importance analyzer 182.

The feature importance analyzer 182 receives the alert indicator 130 and the feature data 120 and generates the feature importance data 140 comprising multiple values 142. In a particular implementation, each of the values 142 corresponds to an average feature importance value for each of the particular features 128 within the temporal window 126 associated with the alert 132. The feature importance data 140 is provided to the historical alert identifier 184, which performs one or more comparisons of the feature importance data 140 to the stored feature importance data 152 associated with historical alerts 150.

Upon identifying the one or more historical alerts 156 that are determined to be most similar to the alert 132, the alert similarity result 186 is output, and data associated with the identified historical alerts 156 is displayed at the graphical user interface 160 for use by the operator 198. For example, the graphical user interface 160 may provide the operator 198 with a list of 5-10 alerts of the historical alerts 150 that are determined to be most similar to the present alert 132. For each of the alerts displayed, a label 164 associated with the historical alert and one or more actions, such as one or more diagnostic actions 168, one or more remedial actions 172, or a combination thereof, may be displayed to the operator 198.

The operator 198 may use the information displayed at the graphical user interface 160 to select one or more diagnostic or remedial actions associated with the alert 132. For example, the operator 198 may input one or more commands to the alert management device 102 to cause a control signal 197 to be sent to the control device 196. The control signal 197 may cause the control device 196 to modify the operation of the device 104, such as to reduce or shut down operation of the device 104. Alternatively or in addition, the control signal 197 may cause the control device 196 to modify operation of the second device 190, such as to operate as a spare or replacement unit to replace reduced capability associated with reducing or shutting down operation of the device 104.

Although the alert similarity result 186 is illustrated as being output to the display device 108 for evaluation and to enable action taken by the operator 198, in other implementations remedial or diagnostic actions may be performed automatically, e.g., without human intervention. For example, in some implementations, the alert management device 102 selects, based on the identified one or more historical alerts 156, the control device 196 of multiple control devices to which the control signal 197 is sent. To illustrate, in an implementation in which the device 104 and the second device 190 are part of a large fleet of assets (e.g., in a wind farm or refinery), multiple control devices may be used to manage groups of the assets. The alert management device 102 may select the particular control device(s) associated with the device 104 and associated with one or more other devices to adjust operation of such assets. In some implementations, the alert management device 102 identifies one or more remedial actions based on a most similar historical alert, such as a set of remedial actions associated with the identified most similar historical alert, and automatically generates the control signal 197 to initiate one or more of the remedial actions, such as to deactivate or otherwise modify operation of the device 104, to activate or otherwise modify operation of the second device 190, or any combination thereof.

By determining alert similarity based on comparisons of the feature importance data 140 to the stored feature importance data 152 for the historical alerts 150, the system 100 accommodates variations over time in the raw sensor data associated with the device 104, such as due to repairs, reboots, and wear, in addition to variations in raw sensor data among various devices of the same type, such as the second device 190. Thus, the system 100 enables improved accuracy, reduced delay, or both, associated with troubleshooting of alerts.

Reduced delay and improved accuracy of troubleshooting of alerts can result in substantial reduction of time, effort, and expense incurred in troubleshooting. As an illustrative, non-limiting example, an alert associated with a wind turbine may conventionally require rental of a crane and incur significant costs and labor resources associated with inspection and evaluation of components in a troubleshooting operation that may span several days. In contrast, use of the system 100 to perform automated label-transfer troubleshooting using feature importance similarity to previous alerts for that wind turbine, previous alerts for other wind turbines of similar types, or both, may generate results within a few minutes, resulting in significant reduction in cost, labor, and time associated with the troubleshooting. Use of the system 100 may enable a wind turbine company to retain fewer SMEs, and in some cases a SME may not be needed for alert troubleshooting except to handle never-before seen alerts that are not similar to the historical alerts. Although described with reference to wind turbines as an illustrative example, it should be understood the system 100 is not limited to use with wind turbines, and the system 100 may be used for alert troubleshooting with any type of monitored asset or fleet of assets.

Although FIG. 1 depicts the display device 108 as coupled to the alert management device 102, in other implementations the display device 108 is integrated within the alert management device 102. Although the alert management device 102 is illustrated as including the alert generator 180, the feature importance analyzer 182, and the historical alert identifier 184, in other implementations the alert management device 102 may omit one or more of the alert generator 180, the feature importance analyzer 182, or the historical alert identifier 184. For example, in some implementations, the alert generator 180 is remote from the alert management device 102 (e.g., the alert generator 180 may be located proximate to, or integrated with, the sensor devices 106), and the alert indicator 130 is received at the feature importance analyzer 182 via the transceiver 118. Although the system 100 includes two devices 104, 190 and two sets of sensor devices 106, 192, in other implementations the system 100 may include any number of devices and any number of sets of sensor devices. In one illustrative example, the system 100 may omit the second device 190, and the historical alerts 150 and the stored feature importance data 152 may correspond to historical data for the device 104. Further, although the system 100 includes the control device 196 responsive to the control signal 197, in other implementations the control device 196 may be omitted and adjustment of operation of the device 104, the second device 190, or both, may be performed manually or via another device or system.

Figure 2:
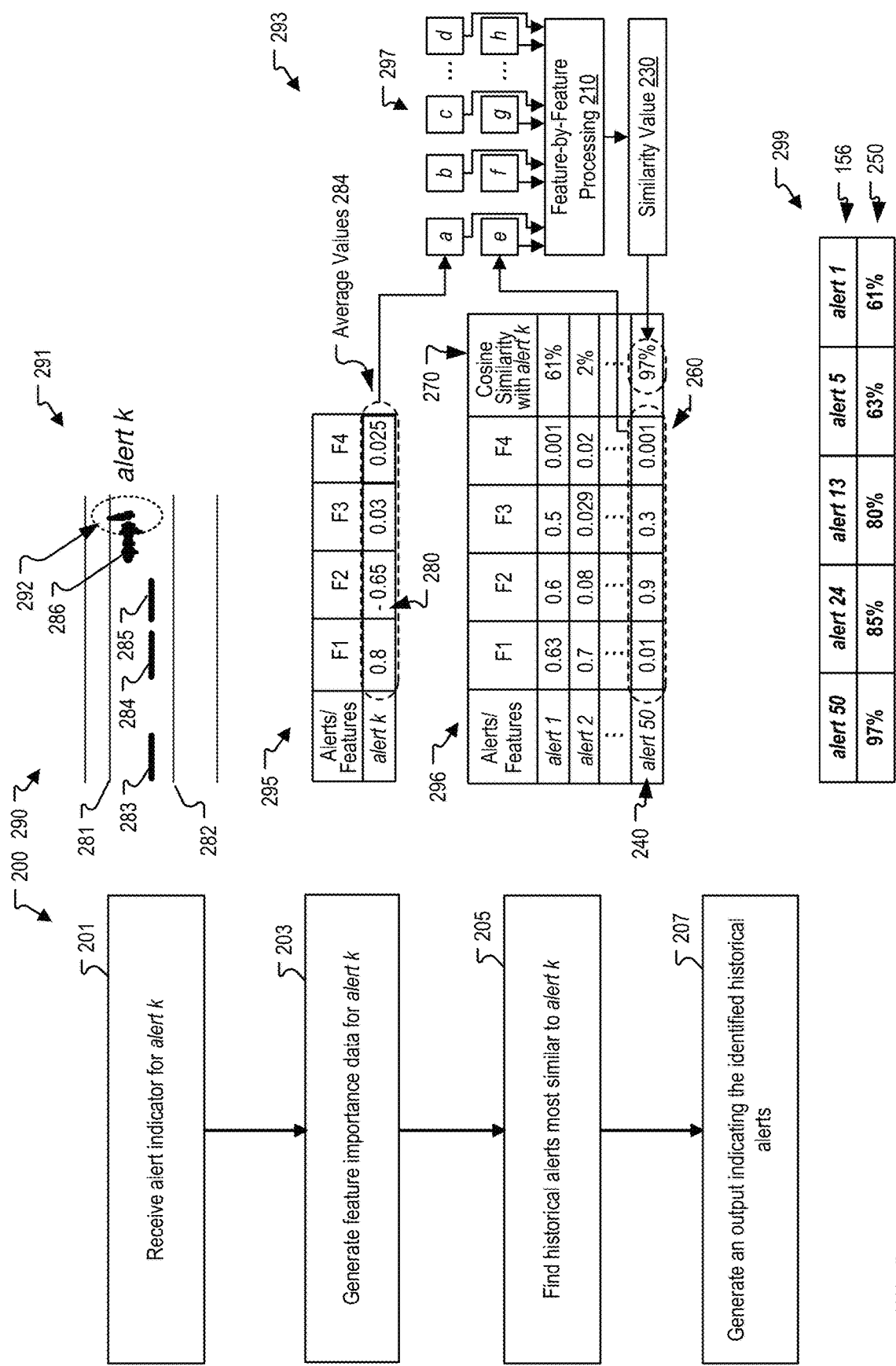
FIG. 2 illustrates a flow chart and diagrams corresponding to operations that may be performed in the system of FIG. 1 according to a particular implementation.

FIG. 2 illustrates a flow chart of a method 200 and associated diagrams 290 corresponding to operations that may be performed in the system 100 of FIG. 1, such as by the alert management device 102, according to a particular implementation. The diagrams 290 include a first diagram 291, a second diagram 293, and a third diagram 299.

The method 200 includes receiving an alert indicator for a particular alert, alert k, where k is a positive integer that represents the particular alert. For example, alerts identified over a history of monitoring one or more assets can be labelled according to a chronological order in which a chronologically first alert is denoted alert 1, a chronologically second alert is denoted alert 2, etc. In some implementations, alert k corresponds to the alert 132 of FIG. 1 that is generated by the alert generator 180 and that corresponds to the alert indicator 130 that is received by the feature importance analyzer 182 in the alert management device 102.

The first diagram 291 illustrates an example graph of a particular feature of the feature data 120 (e.g., a time series of measurement data from a single one of the sensors devices 106), in which a thick, intermittent line represents a time series plot of values of the feature over four measurement periods 283, 284, 285, and 286. In the three prior measurement periods 283, 284, and 285, the feature values maintain a relatively constant value (e.g., low variability) between an upper threshold 281 and a lower threshold 282. In the most recent measurement period 286, the feature values have a larger mean and variability as compared to the prior measure periods 283, 284, and 285. A dotted ellipse indicates a time period 292 (e.g., the temporal window 126) in which the feature data crosses the upper threshold 281 (e.g., the deviation 134), triggering generation of alert k. Although the first diagram 291 depicts generating an alert based on a single feature crossing a threshold for clarity of explanation, it should be understood that generation of an alert may be performed by one or more models (e.g., trained machine learning models) that generate alerts based on evaluation of more than one (e.g., all) of the features in the feature data 120.

The method 200 includes, at 203, generating feature importance data for alert k. For example, the feature importance analyzer 182 generates the feature importance data 140 as described in FIG. 1. In some implementations, the feature importance data 140 includes average values 288 of feature importance, for each feature F1, F2, F3, F4, across the time period 292 corresponding to alert k, as described further with reference to FIG. 5. The set of average values 288 of feature importance data corresponding to alert k is illustrated in a first table 295 in the second diagram 293. It should be understood that although four features F1-F4 are illustrated, in other implementations any number of features (e.g., hundreds, thousands, or more) may be used.

The method 200 includes, at 205, finding historical alerts most similar to alert k, such as described with reference to the historical alert identifier 184 of FIG. 1 or in conjunction with one or both of the examples described with reference to FIG. 3 and FIG. 4. The second diagram 293 illustrates an example of finding the historical alerts that includes identifying the one or more historical alerts based on feature-by-feature processing 210 of the values 142 in the feature importance data 140 (e.g., the average values 284 in the first table 295) with corresponding values 260 in the stored feature importance data 152. The stored feature importance data 140 is depicted in a second table 296 as feature importance values for each of 50 historical alerts (e.g., k=51).

In an illustrative example, identifying the one or more historical alerts 156 includes determining, for each of the historical alerts 150, a similarity value 230 based on feature-by-feature processing 210 of the values 142 in the feature importance data 140 with corresponding values 260 in the stored feature importance data 152 corresponding to that historical alert 240. An example of feature-by-feature processing is illustrated with reference to a set of input elements 297 (e.g., registers or latches) for the feature-by-feature processing 210. The feature importance values for alert k are loaded into the input elements, with the feature importance value for F1 (0.8) in element a, the feature importance value for F2 (−0.65) in element b, the feature importance value for F3 (0.03) in element c, and the feature importance value for F4 (0.025) in element d. The feature importance values for a historical alert, illustrated as alert 50 240, are loaded into the input elements, with the feature importance value for F1 (0.01) in element e, the importance feature value for F2 (0.9) in element f, the feature importance value for F3 (0.3) in element g, and the feature importance value for F4 (0.001) in element h.

The feature-by-feature processing 210 generates the similarity value 230 based on applying an operation to pairs of corresponding feature importance values. In an illustrative example, the feature-by-feature processing 210 multiplies the value in element a with the value in element e, the value in element b with the value in element f, the value in element c with the value in element g, and the value in element d with the value in element h. To illustrate, the feature-by-feature processing 210 may sum the resulting multiplicative products (e.g., to generate the dot product ((alert k)·(alert 50)) and divide the dot product by (‖alert k‖ ‖alert 50‖), where ‖alert k‖ denotes the magnitude of a vector formed of the feature importance values of alert k, and ‖alert 50‖ denotes the magnitude of a vector formed of the feature importance values of alert 50, to generate a cosine similarity 270 indicating an amount of similarity between alert k and alert 50. Treating each alert as a n-dimensional vector (where n=4 in the example of FIG. 2), the cosine similarity 270 describes how similar two alerts are in terms of their orientation with respect to each other.

In some implementations, rather than generating the similarity value 230 of each pair of alerts based on the feature importance value of every feature, a reduced number of features may be used, reducing computation time, processing resource usage, or a combination thereof. To illustrate, a particular number (e.g., 20-30) or a particular percentage (e.g., 10%) of the features having the largest feature importance values for alert k may be selected for comparison to the corresponding features of the historical alerts. In some such implementations, determination of the similarity value 230 includes, for each feature of the feature data, selectively adjusting a sign of a feature importance value for that feature based on whether a value of that feature within the temporal window exceeds a historical mean value for that feature. For example, within the time period 292 corresponding to alert k, the feature value exceeds the historical mean in the measurement period 286, and the corresponding feature importance value is designated with a positive sign (e.g., indicating a positive value). If instead the feature value were below the historical mean, the feature importance value may be designated with a negative sign 280 (e.g., indicating a negative value). In this manner, the accuracy of the cosine similarity 270 may be improved by distinguishing between features moving in different directions relative to their historical means when comparing pairs of alerts.

The method 200 includes, at 207, generating an output indicating the identified historical alerts. For example, one or more of the similarity values 230 that indicate largest similarity of the similarity values 230 are identified. As illustrated in the third diagram 299, the five largest similarity values for alert k correspond to alert 50 with 97% similarity, alert 24 with 85% similarity, alert 13 with 80% similarity, alert 5 with 63% similarity, and alert 1 with 61% similarity. The one or more historical alerts 156 corresponding to the identified one or more of the similarity values 250 are selected for output.

Although the similarity value 230 is described as a cosine similarity 270, in other implementations, one or more other similarity metrics may be determined in place of, or in addition to, cosine similarity. The other similarity metrics may be determined based on the feature-by-feature processing, such as the feature-by-feature processing 210 or as described with reference to FIG. 3, or may be determined based on other metrics, such as by comparing which features are most important for generation of each alert, as described with reference to FIG. 4.

Figure 3:
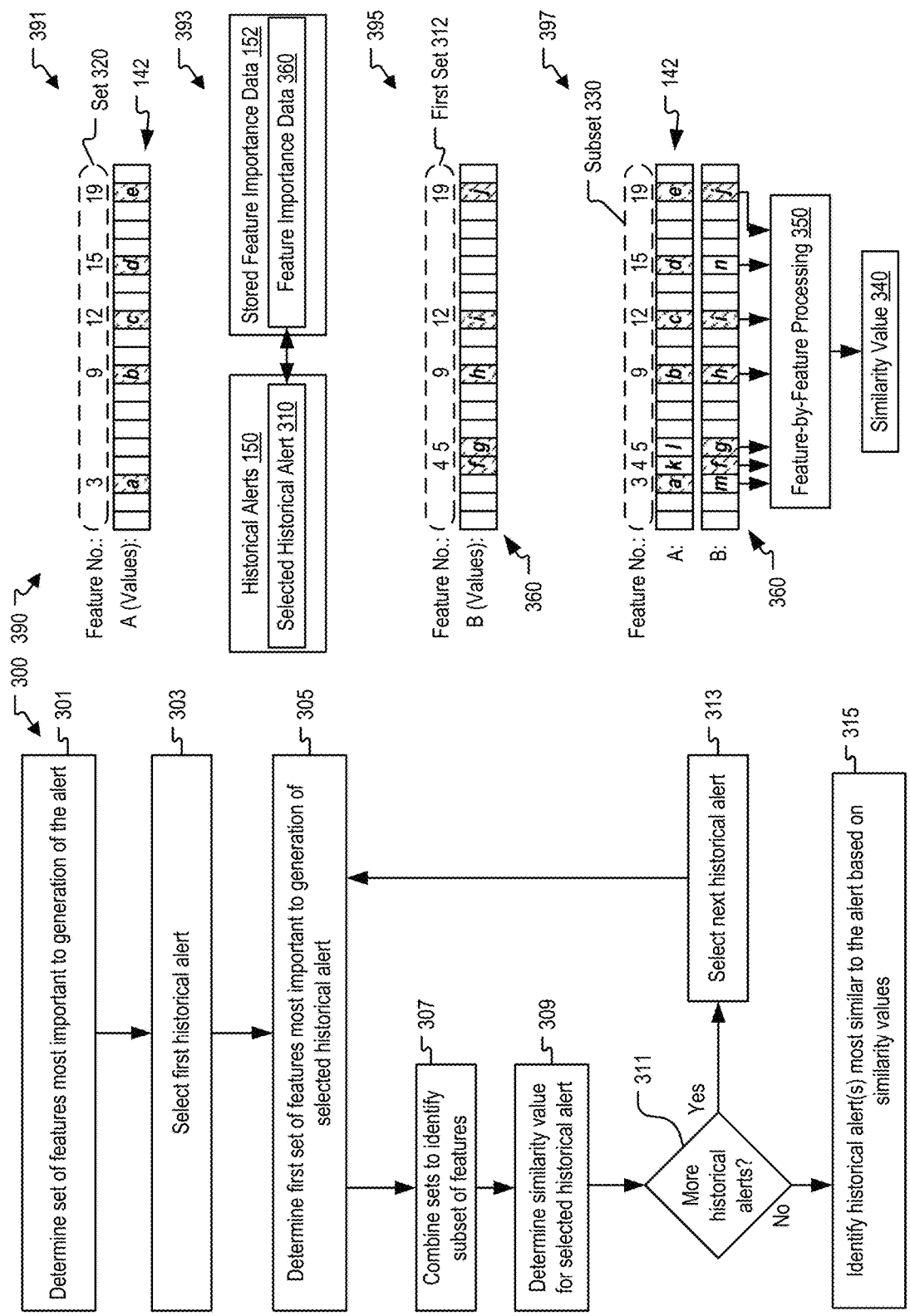
FIG. 3 illustrates a flow chart and diagrams corresponding to operations that may be performed in the system of FIG. 1 to determine alert similarity according to a particular implementation.

FIG. 3 illustrates a flow chart of a method 300 and associated diagrams 390 corresponding to operations that may be performed in the system of FIG. 1, such as by the alert management device 102, to identify historical alerts that are most similar to a present alert, according to a particular implementation. The diagrams 390 include a first diagram 391, a second diagram 393, a third diagram 395, and a fourth diagram 397.

The method 300 of identifying the one or more historical alerts 156 includes performing a processing loop to perform operation for each of the historical alerts 150. The processing loop is initialized by determining a set of features most important to generation of the alert, at 301. For example, the feature importance analyzer 182 generates the feature importance data 140 for the alert 132, and the historical alert identifier 184 may determine the set of features having the largest feature importance values (e.g., a set of features corresponding to the largest feature importance values for the alert 132). An example is illustrated in the first diagram 391, in which the feature importance data 140 includes feature importance values 142 for each of twenty features, illustrated as a vector A of feature importance values. The five largest feature importance values in A (illustrated as a, b, c, d, and e), are identified and correspond to features 3, 9, 12, 15, and 19, respectively. Features 3, 9, 12, 15, and 19 form a set 320 of the most important features for generation of the alert 132.

Initialization of the processing loop further includes selecting a first historical alert (e.g., alert 1 of FIG. 2), at 303. For example, in the second diagram 393, the selected historical alert 310 is selected from the historical alerts 150, and the feature importance data 360 corresponding to the selected historical alert 310 is also selected from the stored feature importance data 152.

The method 300 includes determining a first set of features most important to generation of the selected historical alert, at 305. For example, in the third diagram 395, the feature importance data 360 includes feature importance values for each of twenty features, illustrated as a vector B of feature importance values. The five largest feature importance values in vector B (illustrated as f, g, h, i, and j), are identified and correspond to features 4, 5, 9, 12, and 19, respectively. Features 4, 5, 9, 12, and 19 form a first set 312 of the most important features for generation of the selected historical alert 310.

The method 300 includes combining the sets (e.g., combining the first set 312 of features with the set 320 of features) to identify a subset of features, at 307. For example, in the fourth diagram 397, a subset 330 is formed of features 3, 4, 5, 9, 12, 15, and 19, corresponding to the union of the set 320 and the first set 312.

The method 300 includes determining a similarity value for the selected historical alert, at 309. To illustrate, for the subset 330 of features, a similarity value 340 is generated based on feature-by-feature processing 350 of the values 142 in the feature importance data 140 with corresponding values (e.g., from the feature importance data 360) in the stored feature importance data 152 corresponding to that historical alert 310. As illustrated in the fourth diagram 397, the feature-by-feature processing 350 operates on seven pairs of values from vector A and vector B: values a and m corresponding to feature 3, values k and f corresponding to feature 4, values l and g corresponding to feature 5, values b and h corresponding to feature 9, values c and i corresponding to feature 12, values d and n corresponding to feature 15, and values e and j corresponding to feature 19. For example, the feature-by-feature processing may include multiplying the values in each pair and adding the resulting products, such as during computation of the similarity value 340 as a cosine similarity (as described with reference to FIG. 2) applied to the subset 330 of features.

The method 300 includes determining whether any of historical alerts 150 remain to be processed, at 311. If any of historical alerts 150 remain to be processed, a next historical alert (e.g., alert 2 of FIG. 2) is selected, at 313, and processing returns to a next iteration of the processing loop for the newly selected historical alert, at 305.

Otherwise, if none of historical alerts 150 remain to be processed, the method 300 includes, at 315, identifying one or more historical alerts that are most similar to the alert based on the similarity values. To illustrate, the generated similarity values 340 for each historical alert may be sorted by size, and the historical alerts associated with the five largest similarity values 340 may be identified as the one or more historical alerts 156 most similar to the alert 132.

It should be understood that the particular example depicted in FIG. 3 may be modified in other implementations. For example, the processing loop depicted in FIG. 3 (as well as FIG. 4 and FIG. 5) are described as sequential iterative loops that use incrementing indices for ease of explanation. Such processing loops can be modified in various ways, such as to accommodate parallelism in a system that includes multiple computation units. For example, in an implementation having sufficient processing resources, all of the described loop iterations may be performed in parallel (e.g., no looping is performed). Similarly, loop variables may be initialized to any permissible value and adjusted via various techniques, such as incremented, decremented, random selection, etc. In some implementations, historical data may be stored in a sorted or categorized manner to enable processing of one or more portions of the historical data to be bypassed. Thus, the descriptions of such loops are provided for purpose of explanation rather than limitation.

Figure 4:
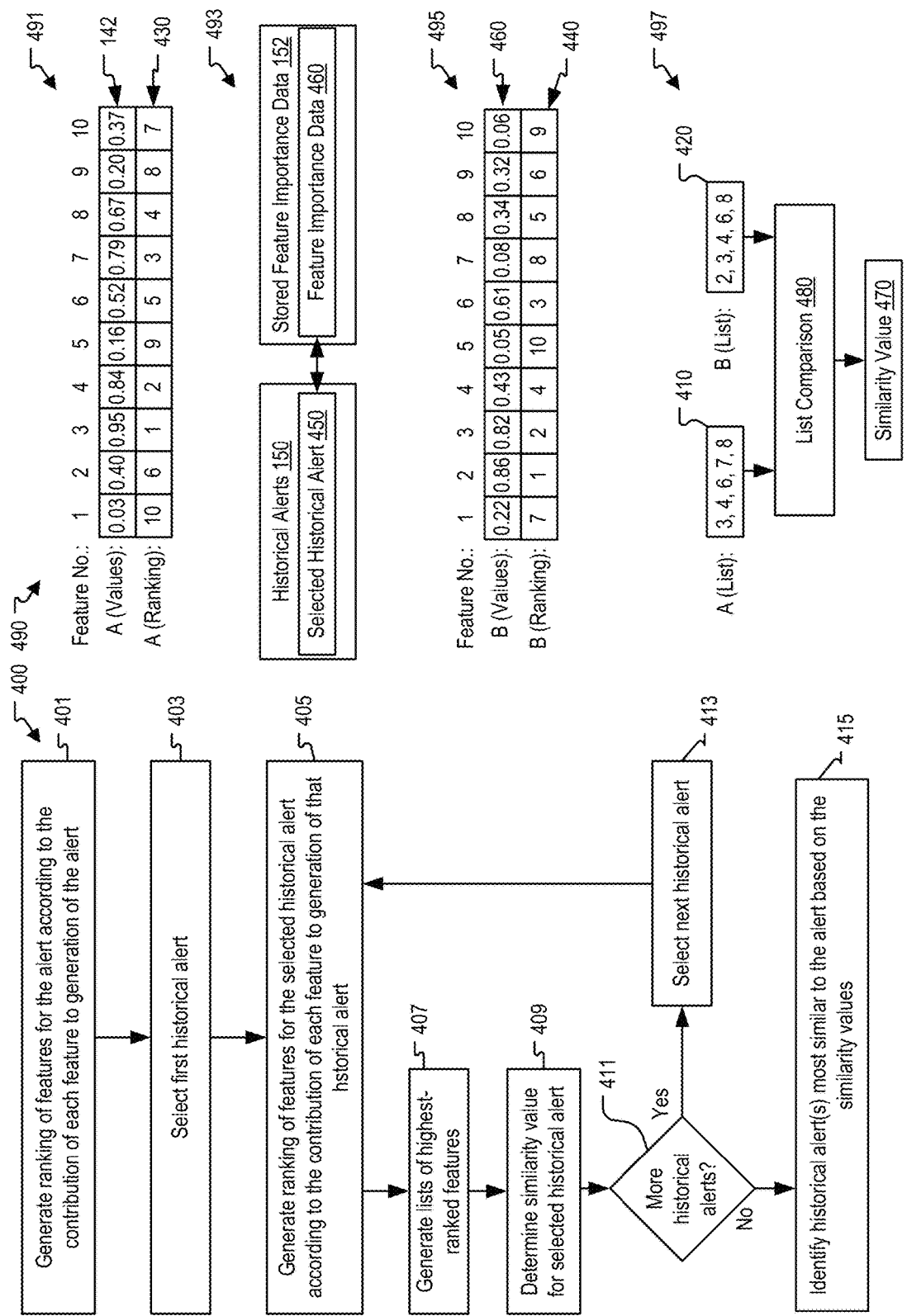
FIG. 4 illustrates a flow chart and diagrams corresponding to operations that may be performed in the system of FIG. 1 to determine alert similarity according to another particular implementation.

FIG. 4 illustrates a flow chart of a method 400 and associated diagrams 490 corresponding to operations that may be performed in the system of FIG. 1, such as by the alert management device 102, to identify historical alerts that are most similar to a present alert, according to a particular implementation. The diagrams 490 include a first diagram 491, a second diagram 493, a third diagram 495, and a fourth diagram 497. As compared to FIG. 3, identifying the one or more historical alerts 156 is based on comparing a list 410 of features having largest relative importance to the alert to lists 420 of features having largest relative importance to the historical alerts 150.

The method 400 includes performing a processing loop to perform operation for each of the historical alerts 150. Initialization of the processing loop includes generating, based on the feature importance data 140, a ranking 430 of the features for the alert according to a contribution of each feature to generation of the alert, at 401. For example, the feature importance analyzer 182 generates the feature importance data 140 for the alert 132, and historical alert identifier 184 may determine the set of features having the largest feature importance values (e.g., a set of features corresponding to the largest feature importance values for the alert 132). An example is illustrated in the first diagram 491, in which the feature importance data 140 includes feature importance values 142 for each of ten features, illustrated as a vector A of feature importance values. Rankings 430 are determined for each feature based on the feature importance value associated with that feature. As illustrated, the largest feature importance value in vector A is 0.95, which corresponds to feature 3. As a result, feature 3 is assigned a ranking of 1 to indicate that feature 3 is the highest ranked feature. The second-largest feature importance value in vector A is 0.84 corresponding to feature 4; as a result, feature 4 is assigned a ranking of 2. The smallest feature importance value in vector A is 0.03 corresponding to feature 1; as a result, feature 1 is assigned a ranking of 10.

Initialization of the processing loop further includes selecting a first historical alert (e.g., alert 1 of FIG. 2), at 403. For example, in the second diagram 493, the selected historical alert 450 is selected from the historical alerts 150, and the feature importance data 460 corresponding to the selected historical alert 450 is also selected from the stored feature importance data 152.

The method 400 includes, at 405, generating a ranking of features for the selected historical alert according to the contribution of each feature to generation of that historical alert. For example, the third diagram 495 illustrates generating, based on the stored feature importance data for that historical alert 450, a ranking 440 of features for that historical alert according to the contribution of each feature to generation of that historical alert. The feature importance data 460 includes feature importance values for each of ten features, illustrated as a vector B of feature importance values. The features of vector B are ranked by the size of each feature's feature importance value in a similar manner as described for vector A.

The method 400 includes generating lists of highest-ranked features, at 407. For example, as illustrated in the fourth diagram 497, a list 410 has the five highest ranked features from vector A and a list 420 has the five highest ranked features from vector B.

The method 400 includes determining a similarity value for the selected historical alert, at 409. As illustrated in the fourth diagram 497, a similarity value 470 is determined for the selected historical alert 450 indicating how closely the list 410 of highest-ranked features for the alert 132 matches the list 420 of highest-ranked features for that historical alert 450.

To illustrate, a list comparison 480 may determine the amount of overlap of the lists 410 and 420, such as by comparing each feature in the first list 410 to the features in the second list 420, and incrementing a counter each time a match is found. To illustrate, features 3, 4, and 8 are present in both lists 410, 420, resulting in a counter value of 3. The count of features that are common to both lists may be output as the similarity value 470, where higher values of the similarity value 470 indicate higher similarity and lower values of the similarity value 470 indicate lower similarity. In some implementations, the similarity value 470 may be further adjusted, such as scaled to a value between 0 and 1.

The method 400 includes determining whether any of historical alerts 150 remain to be processed, at 411. If any of historical alerts 150 remain to be processed, a next historical alert (e.g., alert 2 of FIG. 2) is selected, at 413, and processing returns to a next iteration of the processing loop for the newly selected historical alert, at 405.

Otherwise, if none of historical alerts 150 remain to be processed, the method 400 includes, at 415, identifying one or more historical alerts most similar to the alert based on the similarity values, at 415. As an example, one or more of the similarity values are identified that indicate largest similarity of the determined similarity values 470, and the one or more historical alerts corresponding to the identified one or more of the similarity values are selected. To illustrate, the generated similarity values 470 for each historical alert may be sorted by size, and the historical alerts associated with the five largest similarity values 470 may be identified as the most similar to the alert 132.

FIG. 5 illustrates a flow chart of a method 500 and associated diagrams 590 corresponding to operations that may be performed in the system of FIG. 1, such as by the feature importance analyzer 182, to determine, for each of the features 128, a feature importance value 520 indicating the contribution of that feature to generation of the alert 132 for each time interval within the temporal window 126. The diagrams 590 include a first diagram 591, a second diagram 595, and a third diagram 597.

The method 500 includes initializing a processing loop by selecting a first feature of the features 128, at 501, and selecting a first time interval of the time intervals 123, at 503. For example, the first diagram 591 illustrates feature data for N features, labelled F1, F2, ... FN, and 50 time intervals t2, t3, ... t51 within the temporal window 126 associated with the alert 132. The first feature F1 and the first time interval t2 within the temporal window 126 may be selected.

The method 500 includes nested processing loops over the time intervals in the temporal window (e.g., incrementing from t2 to t51) and over the features (e.g., incrementing from F1 to FN). For each selected feature and selected time interval, the method 500 includes determining a feature importance value indicating a contribution of the selected feature to generation of the alert 132 for the selected time interval, at 505. For example, a feature importance value operation 593 can generate the feature importance value for feature F1 and time interval t2 can include one or more comparisons of the value (v1,2) to a historical mean of values for feature F1, to one or more thresholds, or a combination thereof. Alternatively or in addition, the feature importance value operation 593 can generate the feature importance value for feature F1 and time interval t2 based on one or more trained models. In some implementations, the feature importance value operation 593 corresponds to a Quartile Feature Importance operation. In other implementations, the feature importance value operation 593 may alternatively, or in addition, include one or more other feature importance techniques, such as KDE feature importance or random forest, as non-limiting examples.

The method 500 includes determining whether there are more time intervals in the temporal window 126 that have not been processed for the selected feature, at 507. If there are one or more unprocessed time intervals, a next time interval (e.g., t3) is selected, at 509, and processing returns to a next iteration, at 505. After all time intervals in the temporal window 126 have been processed for the selected feature (e.g., the selected time interval is t51), the method 500 advances to a determination of whether there are more features of the features 128 that have not been processed. If there are one or more unprocessed features, a next feature (e.g., F2) is selected, at 513, and processing returns to a next iteration, at 503. The second diagram 595 illustrates a table of the feature importance values 520 that are generated for each of the features 128 and for each of the time intervals in the temporal window 126.

After all of the features 128 have been processed (e.g., the selected feature is FN), the method 500 includes processing, for each of the features 128, the feature importance values 520 of that feature to generate an average feature importance value 599 for that feature, at 515. For example, an average operation 596 can generate, for each feature, an average (e.g., an arithmetic mean) of the feature importance values 520 for that feature, resulting in a single average feature importance value for each feature, illustrated as a set of average feature importance values 599 in the third diagram 597. The average feature importance values 599 can be used as the feature importance data 140 and may be added to the stored feature importance data 152 for future comparisons when diagnosing later detected alerts.

Figure 6:
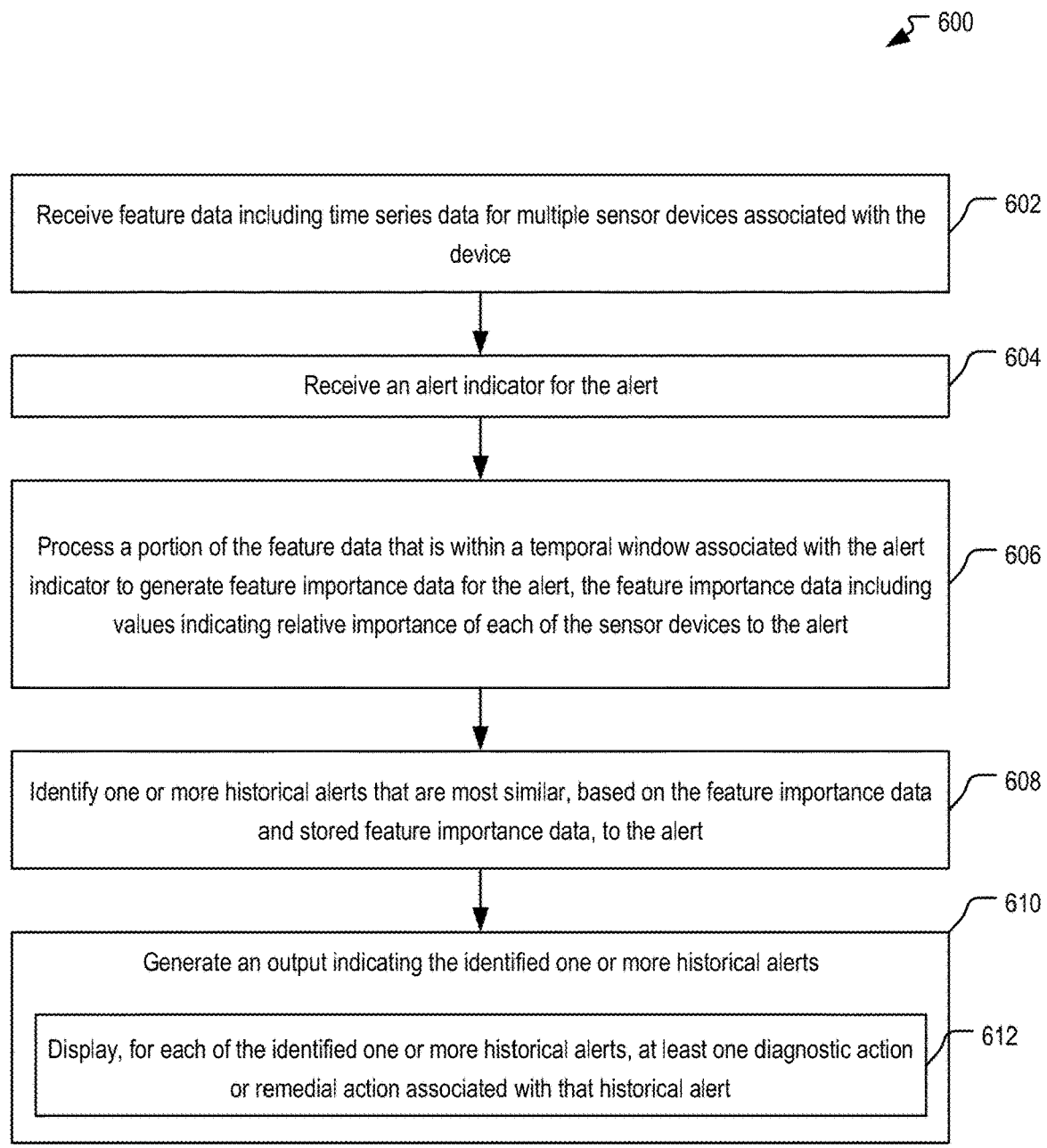
FIG. 6 is a flow chart of a first example of a method of identifying a historical alert that is similar to an alert associated with a detected deviation from an operational state of a device.

FIG. 6 is a flow chart of a method 600 of identifying a historical alert that is similar to an alert associated with a detected deviation from an operational state of a device. In a particular implementation, the method 600 can be performed by the alert management device 102, the alert generator 180, the feature importance analyzer 182, the historical alert identifier 184, or a combination thereof.

The method 600 includes, at 602, receiving feature data including time series data for multiple sensor devices associated with the device. For example, the feature importance analyzer 182 receives the feature data 120 including the time series data 122 for the sensor devices 106 associated with the device 104.

The method 600 includes, at 604, receiving an alert indicator for the alert. For example, the feature importance analyzer 182 receives the alert indicator 130 for the alert 132 from the alert generator 180. In some implementations, the alert 132 is associated with the detected deviation 134 from an operational state of a device 104.

The method 600 includes, at 606, processing a portion of the feature data that is within a temporal window associated with the alert indicator to generate feature importance data for the alert. The feature importance data includes values indicating relative importance of each of the sensor devices to the alert. For example, the feature importance analyzer 182 processes the portion 124 of the feature data 120 that is within a temporal window 126 associated with the alert indicator 130 to generate the feature importance data 140 for the alert 132, such as described with reference to FIG. 5. In an illustrative example, processing the portion 124 of the feature data 120 includes determining, for each of the features 128, a feature importance value 520 indicating the contribution of that feature to generation of the alert 132 for each time interval within the temporal window 126, and processing, for each of the features 128, the feature importance values 520 of that feature to generate an average feature importance value 540 for that feature, such as described with reference to the method 500 of FIG. 5.

In some implementations, each feature 128 of the feature data 120 corresponds to the time series data 122 for a corresponding sensor device of the multiple sensor devices 106, the alert 132 is generated responsive to anomalous behavior of one or more of the features 128, and processing the portion 124 of the feature data 120 includes determining, for each of the features 128, a feature importance value 520 indicating the contribution of that feature to generation of the alert 132 for each time interval within the temporal window 126, and processing, for each of the features 128, the feature importance values 520 of that feature to generate an average feature importance value 540 for that feature, such as described with reference to the method 500 of FIG. 5.

The method 600 includes, at 608, identifying one or more historical alerts that are most similar, based on the feature importance data and stored feature importance data, to the alert. For example, the historical alert identifier 184 identifies the one or more historical alerts 156 that are most similar to the alert 132 based on the feature importance data 140 and the stored feature importance data 152. At least one of the historical alerts may correspond to a previous alert for the device 104, an alert for the second device 190, an alert for one or more other devices, or a combination thereof.

In some implementations, identifying the one or more historical alerts is based on feature-by-feature processing of the values in the feature importance data with corresponding values in the stored feature importance data, such as the feature-by-feature processing 210 of FIG. 2 or the feature-by-feature processing 350 of FIG. 3, as non-limiting examples. In other implementations, identifying the one or more historical alerts is based on comparing a list of features having largest relative importance to the alert to lists of features having largest relative importance to the historical alerts, such as the list comparison 480 of FIG. 4.

In some implementations, the method 600 includes, at 610, generating an output indicating the identified one or more historical alerts. For example, historical alert identifier 184 provides the alert similarity result 186 to the display interface 116, and the display interface 116 outputs the device output signal 188 for display at the display device 108. In some implementations, each of the historical alerts 150 includes a label 164, and generating the output includes displaying, for each of the identified one or more historical alerts 156, the label 164 associated with that historical alert.

In some implementations, generating the output includes displaying, for each of the identified one or more historical alerts, at least one diagnostic action or remedial action associated with that historical alert, at 612. For example, the display device 108 displays, for each of the identified one or more historical alerts 156, at least one diagnostic action 168 or remedial action 172 associated with that historical alert.

In some implementations, the method 600 also includes generating a graphical user interface that includes a graph indicative of a performance metric of the device over time, a graphical indication of the alert corresponding to a portion of the graph, and an indication of one or more sets of the feature data associated with the alert. For example, the graphical user interface described with reference to FIG. 8 may be generated at the display device 108 to assist an operator or an SME to further diagnose the alert.

In some implementations, the method 600 includes selecting, based on the identified one or more historical alerts, a control device to send a control signal to. For example, the alert management device 102 selects the control device 196 and sends the control signal 197 to modify operation of the device 104, the second device 190, or a combination thereof.

The method 600 may include one or more aspects of the method 200 of FIG. 2, the method 300 of FIG. 3, the method 400 of FIG. 4, or any combination thereof. As a first example, identifying the one or more historical alerts includes determining, for each of the historical alerts 150, a similarity value 230 based on feature-by-feature processing 210 of the values 142 in the feature importance data 140 with corresponding values 260 in the stored feature importance data 152 corresponding to that historical alert 240, identifying one or more of the similarity values that indicate largest similarity of the similarity values, and selecting the one or more historical alerts 156 corresponding to the identified one or more of the similarity values 250, such as described with reference to in FIG. 2. The similarity value 230 may correspond to a cosine similarity 270, and determining the similarity value 230 may include, for each feature of the feature data, selectively adjusting a sign (e.g., adding a negative sign 280) of a feature importance value for that feature based on whether a value of that feature within the temporal window exceeds a historical mean value 290 for that feature.

As a second example, identifying the one or more historical alerts includes, for each of the historical alerts, determining a first set 312 of features providing the largest contributions to generation of that historical alert 310, combining the first set 312 of features with a set 320 of features providing the largest contributions to generation of the alert 132 to identify a subset 330 of features, and determining, for the subset 330 of features, a similarity value 340 based on feature-by-feature processing 350 of the values 142 in the feature importance data 140 with corresponding values of the feature importance data 360 in the stored feature importance data 152 corresponding to that historical alert 310, such as described with reference to FIG. 3.

As a third example, identifying the one or more historical alerts 156 includes generating, based on the feature importance data 140, a ranking 430 of the features for the alert according to a contribution of each feature to generation of the alert. Identifying the one or more historical alerts may also include, for each of the historical alerts 150, generating, based on the stored feature importance data for that historical alert 450, a ranking 440 of features for that historical alert according to the contribution of each feature to generation of that historical alert, determining a similarity value 470 for that historical alert indicating how closely a list 410 of highest-ranked features for the alert 132 matches a list 420 of highest-ranked features for that historical alert 450, identifying one or more of the similarity values that indicate largest similarity of the determined similarity values, and selecting the one or more historical alerts corresponding to the identified one or more of the similarity values, such as described with reference to FIG. 4.

By determining alert similarity based on comparisons of the feature importance data to the stored feature importance data for the historical alerts, the method 600 accommodates variations over time in the raw sensor data associated with the device, such as due to repairs, reboots, and wear, in addition to variations associated with raw sensor data among various devices of the same type. Thus, the method 600 enables improved accuracy, reduced delay, or both, associated with troubleshooting of alerts.

Figure 7:
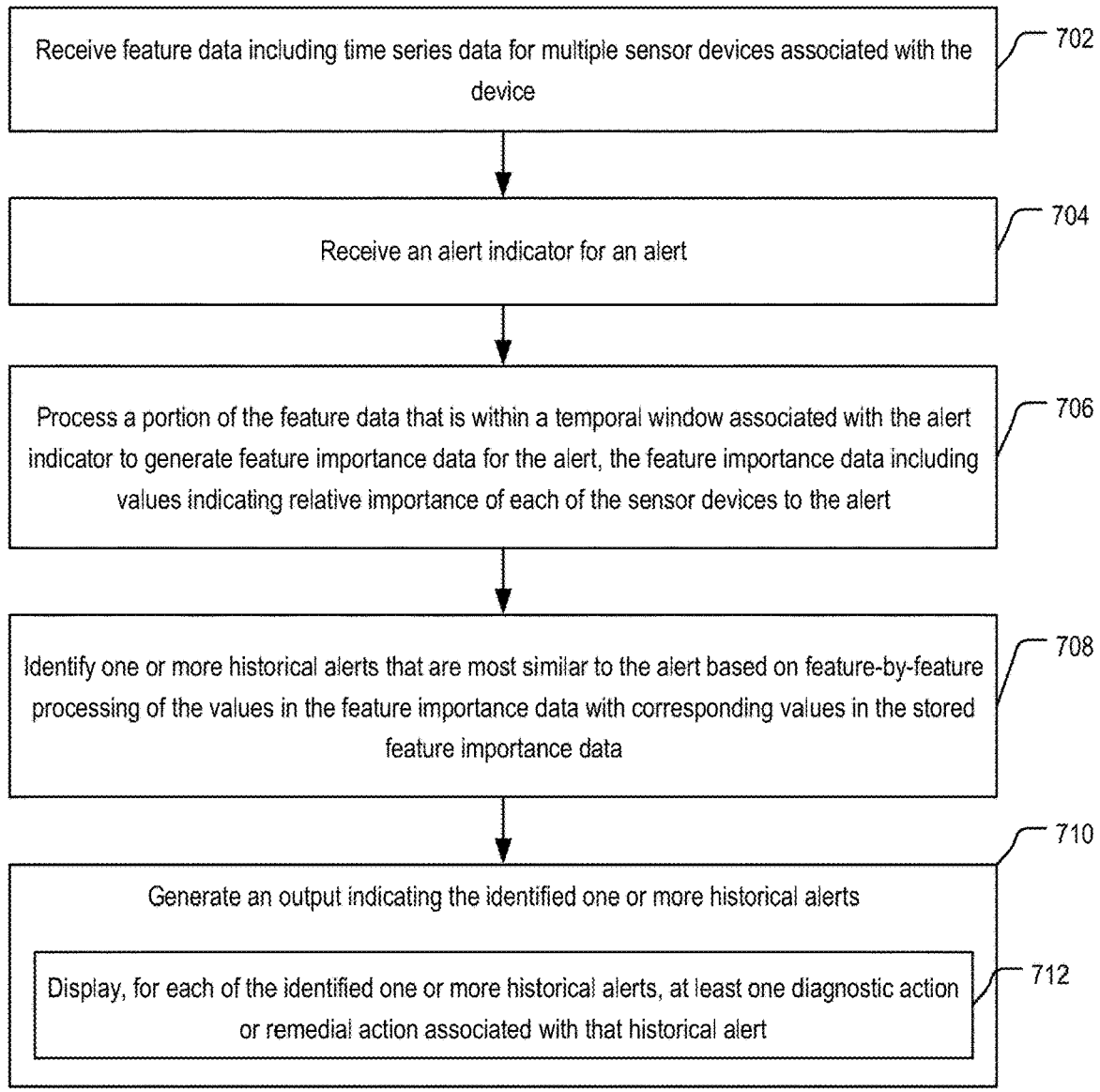
FIG. 7 is a flow chart of a second example of a method of identifying a historical alert that is similar to an alert associated with a detected deviation from an operational state of a device.

FIG. 7 is a flow chart of a method 700 of identifying a historical alert that is similar to an alert associated with a detected deviation from an operational state of a device. In a particular implementation, the method 700 can be performed by the alert management device 102, the alert generator 180, the feature importance analyzer 182, the historical alert identifier 184, or a combination thereof.

The method 700 includes, at 702, receiving feature data including time series data for multiple sensor devices associated with the device. For example, the feature importance analyzer 182 receives the feature data 120 including the time series data 122 for the sensor devices 106 associated with the device 104.

The method 700 includes, at 704, receiving an alert indicator for the alert. For example, the feature importance analyzer 182 receives the alert indicator 130 for the alert 132 from the alert generator 180. In some implementations, the alert 132 is associated with the detected deviation 134 from an operational state of a device 104.

The method 700 includes, at 706, processing a portion of the feature data that is within a temporal window associated with the alert indicator to generate feature importance data for the alert. The feature importance data including values indicating relative importance of each of the sensor devices to the alert. For example, the feature importance analyzer 182 processes the portion 124 of the feature data 120 that is within a temporal window 126 associated with the alert indicator 130 to generate the feature importance data 140 for the alert 132, such as described with reference to FIG. 5. In an illustrative example, processing the portion 124 of the feature data 120 includes determining, for each of the features 128, a feature importance value 520 indicating the contribution of that feature to generation of the alert 132 for each time interval within the temporal window 126, and processing, for each of the features 128, the feature importance values 520 of that feature to generate an average feature importance value 540 for that feature, such as described with reference to the method 500 of FIG. 5.

The method 700 includes, at 708, identifying one or more historical alerts that are most similar to the alert based on feature-by-feature processing of the values in the feature importance data with corresponding values in the stored feature importance data, such as the feature-by-feature processing 210 of FIG. 2 or the feature-by-feature processing 350 of FIG. 3, as non-limiting examples. The historical alert identifier 184 identifies the one or more historical alerts 156 that are most similar to the alert 132 based on the feature importance data 140 and the stored feature importance data 152. At least one of the historical alerts may correspond to a previous alert for the device 104, an alert for the second device 190, an alert for one or more other devices, or a combination thereof.

In some implementations, the method 700 includes, at 710, generating an output indicating the identified one or more historical alerts. For example, historical alert identifier 184 provides the alert similarity result 186 to the display interface 116, and the display interface 116 outputs the device output signal 188 for display at the display device 108. In some implementations, each of the historical alerts 150 includes a label 164, and generating the output includes displaying, for each of the identified one or more historical alerts 156, the label 164 associated with that historical alert.

In some implementations, generating the output includes displaying, for each of the identified one or more historical alerts, at least one diagnostic action or remedial action associated with that historical alert, at 712. For example, the display device 108 displays, for each of the identified one or more historical alerts 156, at least one diagnostic action 168 or remedial action 172 associated with that historical alert.

In some implementations, the method 700 also includes generating a graphical user interface that includes a graph indicative of a performance metric of the device over time, a graphical indication of the alert corresponding to a portion of the graph, and an indication of one or more sets of the feature data associated with the alert. For example, the graphical user interface described with reference to FIG. 8 may be generated at the display device 108 to assist an operator or an SME to further diagnose the alert.

In some implementations, the method 700 includes selecting, based on the identified one or more historical alerts, a control device to send a control signal to. For example, the alert management device 102 selects the control device 196 and sends the control signal 197 to modify operation of the device 104, the second device 190, or a combination thereof.

The method 700 may include one or more aspects of the method 200 of FIG. 2, the method 300 of FIG. 3, or any combination thereof. As a first example, identifying the one or more historical alerts includes determining, for each of the historical alerts 150, a similarity value 230 based on feature-by-feature processing 210 of the values 142 in the feature importance data 140 with corresponding values 260 in the stored feature importance data 152 corresponding to that historical alert 240, identifying one or more of the similarity values that indicate largest similarity of the similarity values, and selecting the one or more historical alerts 156 corresponding to the identified one or more of the similarity values 250, such as described with reference to in FIG. 2. The similarity value 230 may correspond to a cosine similarity 270, and determining the similarity value 230 may include, for each feature of the feature data, selectively adjusting a sign (e.g., adding a negative sign 280) of a feature importance value for that feature based on whether a value of that feature within the temporal window exceeds a historical mean value 290 for that feature.

As a second example, identifying the one or more historical alerts includes, for each of the historical alerts, determining a first set 312 of features providing the largest contributions to generation of that historical alert 310, combining the first set 312 of features with a set 320 of features providing the largest contributions to generation of the alert 132 to identify a subset 330 of features, and determining, for the subset 330 of features, a similarity value 340 based on feature-by-feature processing 350 of the values 142 in the feature importance data 140 with corresponding values of the feature importance data 360 in the stored feature importance data 152 corresponding to that historical alert 310, such as described with reference to FIG. 3.

By determining alert similarity based on comparisons of the feature importance data to the stored feature importance data for the historical alerts, the method 700 accommodates variations over time in the raw sensor data associated with the device, such as due to repairs, reboots, and wear, in addition to variations associated with raw sensor data among various devices of the same type. Thus, the method 700 enables improved accuracy, reduced delay, or both, associated with troubleshooting of alerts.

Figure 8:
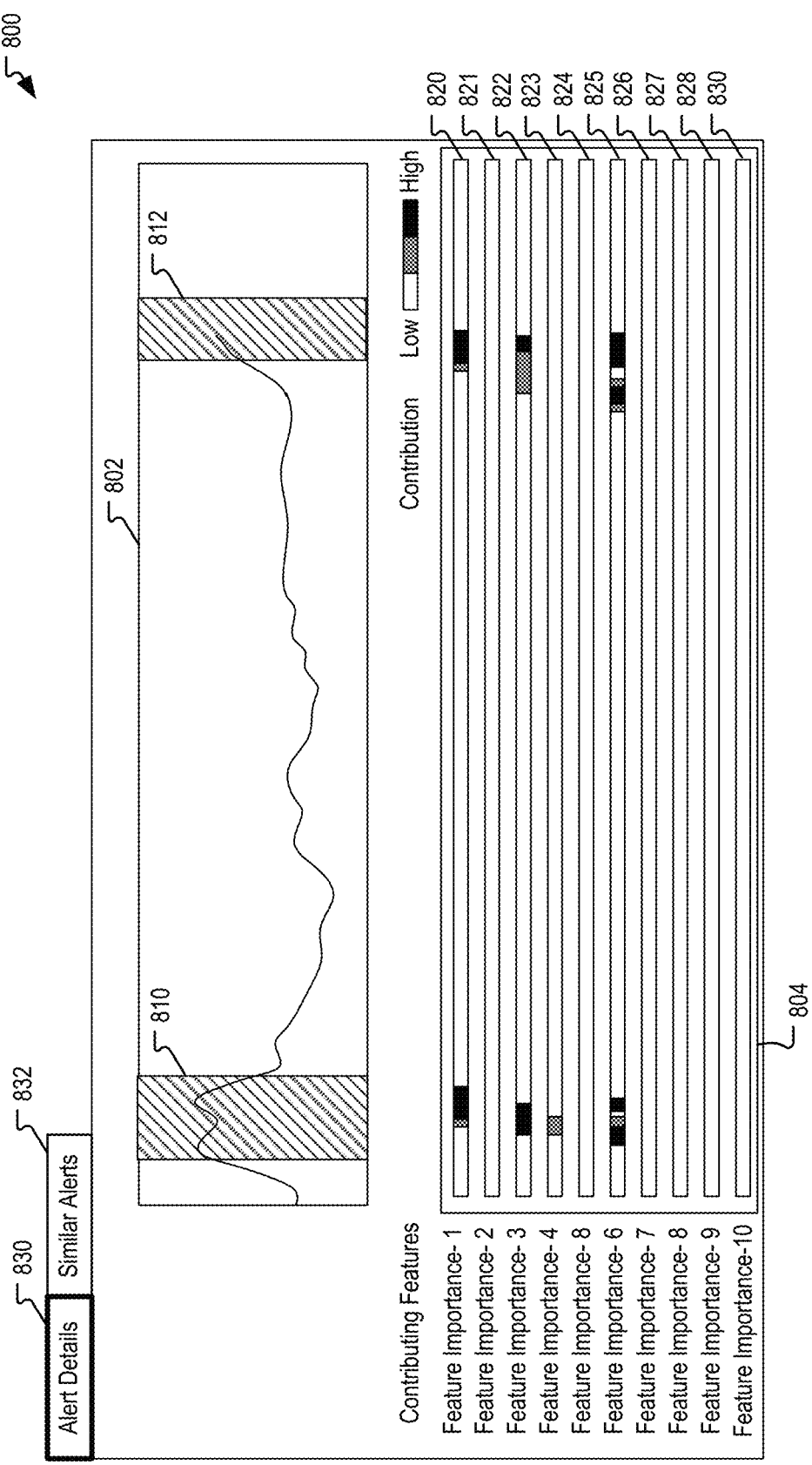
FIG. 8 is a depiction of a first example of a graphical user interface that may be generated by the system of FIG. 1 in accordance with some examples of the present disclosure.

FIG. 8 depicts an example of a graphical user interface 800, such as the graphical user interface 160 of FIG. 1 or a graphical user interface that may be displayed at a display screen of another display device, as non-limiting examples. The graphical user interface 800 includes a graph 802 indicative of a performance metric (e.g., a risk score) of the device over time. As illustrated, the graphical user interface 800 also includes a graphical indication 812 of the alert 132 corresponding to a portion of the graph and a graphical indication 810 of a prior alert within the time period illustrated on the graph 802. The graphical user interface 800 includes an Alert Details screen selection control 830 (highlighted to indicate the Alert Details screen is being displayed) and a Similar Alerts screen selection control 832.

The graphical user interface 800 also includes an indication 804 of one or more sets of the feature data associated with the alert 132 corresponding to the graphical indication 812 and the prior alert corresponding to the graphical indication 810. For example, a first indicator 820 extends horizontally under the graph 802 and has different visual characteristics (depicted as white, grey, or black) indicating the relative contributions of a first feature (e.g., sensor data from a first sensor device of the sensor devices 106) in determining to generate the graphical indication 810 and the graphical indication 812. Similarly, a second indicator 821 indicates the relative contributions of a second feature in determining to generate the graphical indication 810 and the graphical indication 812. Indicators 822-830 indicate the relative contributions of third, fourth, fifth, sixth, seventh, eighth, ninth, and tenth features, respectively, in determining to generate the graphical indication 810 and the graphical indication 812. Although ten indicators 821-830 for ten graphical are illustrated, in other implementations fewer than ten features or more than ten features may be used.

For example, the first graphical indication 810 shows that the sixth feature had a high contribution at a beginning of the first graphical indication 810, followed by high contributions of the first feature and the third feature, and a medium contribution of the fourth feature. Providing relative contributions of each feature to an alert determination can assist a subject matter expert to diagnose an underlying cause of abnormal behavior, to determine a remedial action to perform responsive to the alert determination, or both.

Figure 9:
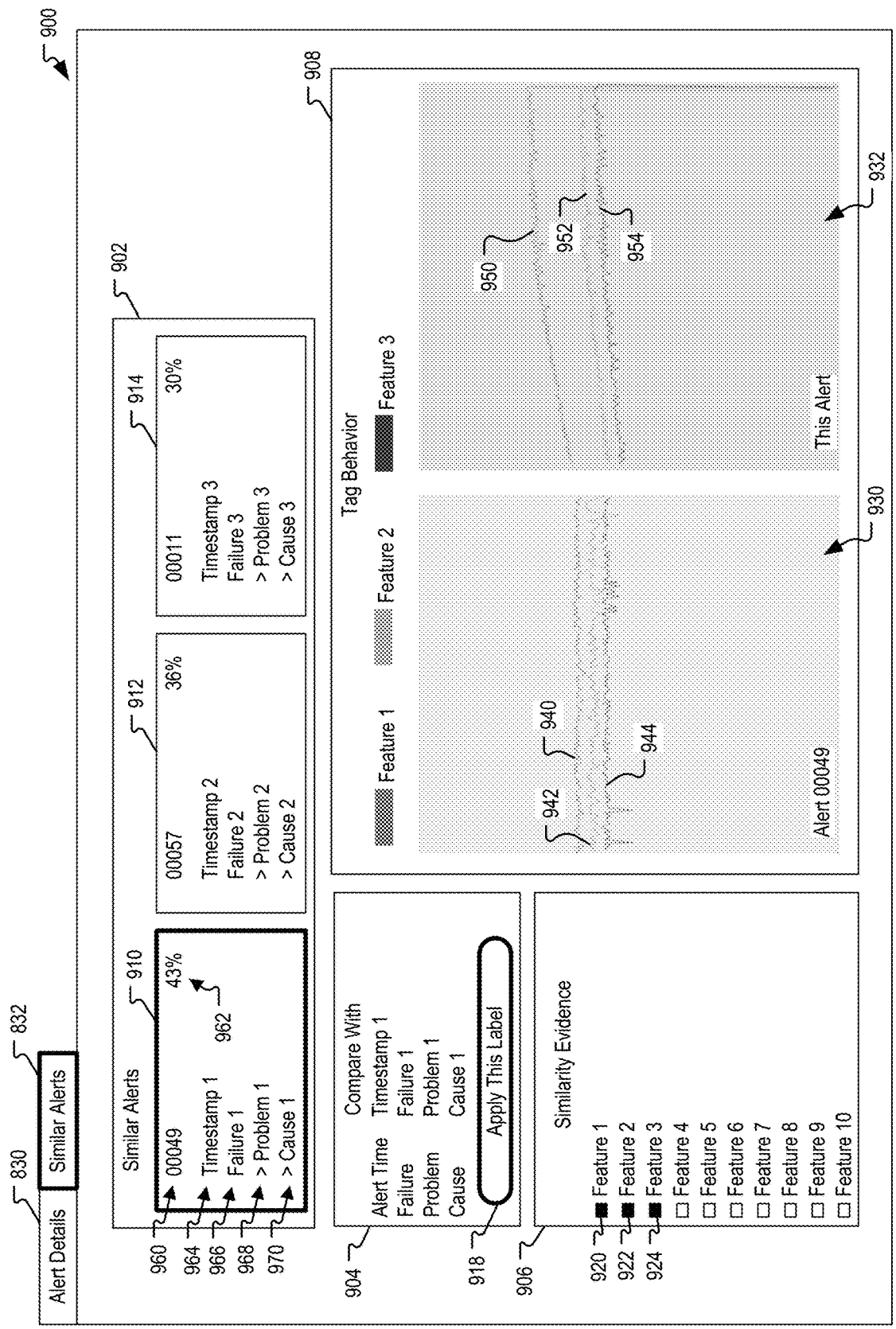
FIG. 9 is a depiction of a second example of a graphical user interface that may be generated by the system of FIG. 1 in accordance with some examples of the present disclosure.

FIG. 9 depicts a second example of a graphical user interface 900, such as the graphical user interface 160 of FIG. 1 or a graphical user interface that may be displayed at a display screen of another display device, as non-limiting examples. The graphical user interface 900 includes the Alert Details screen selection control 830 and the Similar Alerts screen selection control 832 (highlighted to indicate the Similar Alerts screen is being displayed). The graphical user interface 900 includes a list of similar alerts 902, a selected alert description 904, a similarity evidence selector 906, and a comparison portion 908.

The list of similar alerts 902 includes descriptions of multiple alerts determined to be most similar to a current alert (e.g., the alert 132), including a description of a first historical alert 910, a second historical alert 912, and a third historical alert 914. For example, the description of the first historical alert 910 includes an alert identifier 960 of the historical alert, a similarity metric 962 of the historical alert to the current alert (e.g., the similarity value 230, 340, or 470), a timestamp 964 of the historical alert, a failure description 966 of the historical alert, a problem 968 associated with the historical alert, and a cause 970 associated with the historical alert. As an illustrative, non-limiting example, in an implementation for a wind turbine, the failure description 966 may indicate "cracked trailing edge blade," the problem 968 may indicate "surface degradation," and the cause 970 may indicate "thermal stress." Although descriptions of three historical alerts are illustrated, in other implementations fewer than three or more than three historical alerts may be displayed.

Each of the historical alert descriptions 910, 912, and 914 is selectable to enable comparisons of the selected historical alert to the current alert. As illustrated, the description of the first historical alert 910 is highlighted to indicate selection, and content of the description of the first historical alert 910 is displayed in the selected alert description 904. The selected alert description 904 also includes a selectable control 918 to apply the label of the selected historical alert to the current alert. For example, a user of the graphical user interface 900 (e.g., a subject matter expert) may determine that the selected historical alert corresponds to the current alert after comparing each of alerts in the list of similar alerts 910 to the current alert using the similarity evidence selector 906 and the comparison portion 908.

The similarity evidence selector 906 includes a list of selectable features to be displayed in a first graph 930 and a second graph 932 of the comparison portion 908. The first graph 930 displays values of each of the selected features over a time period (e.g., the temporal window 126) for the selected historical alert, and the second graph 932 displays values of each of the selected features over a corresponding time period for the current alert. As illustrated, the user has selected a first selection control 920 corresponding to a first feature, a second selection control 922 corresponding to a second feature, and a third selection control 924 corresponding to a third feature. In response to these selections in the similarity evidence selector 906, the first feature is plotted in a trace 940 in the first graph 930 and a trace 950 in the second graph 932, the second feature is plotted in a trace 942 in the first graph 930 and a trace 952 in the second graph 932, and the third feature is plotted in a trace 944 in the first graph 930 and a trace 954 in the second graph 932.

The graphical user interface 900 thus enables a user to evaluate the historical alerts determined to be most similar to the current alert, via side-by-side visual comparisons of a selected one or more (or all) of the features for the alerts. In response to determining that a particular historical alert sufficiently matches the current alert, the user may assign the label of the particular historical alert to the current alert via actuating the selectable control 918. As a result, the failure mode, problem description, and cause of the historical alert may be applied to the current alert and can be used to determine a remedial action to perform responsive to the current alert.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module or a decision model may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In conjunction with the described devices and techniques, a first apparatus for identifying a historical alert that is similar to an alert associated with a detected deviation from an operational state of a device is described.

The first apparatus includes means for receiving feature data including time series data for multiple sensor devices associated with the device. For example, the means for receiving the feature data may include the alert management device 102, the transceiver 118, the one or more processors 112, the alert generator 180, the feature importance analyzer 182, one or more devices or components configured to receive the feature data, or any combination thereof.

The first apparatus includes means for receiving an alert indicator for the alert. For example, the means for receiving the alert indicator may include the alert management device 102, the transceiver 118, the one or more processors 112, the feature importance analyzer 182, one or more devices or components configured to receive the alert indicator, or any combination thereof.

The first apparatus includes means for processing a portion of the feature data that is within a temporal window associated with the alert indicator to generate feature importance data for the alert, the feature importance data including values indicating relative importance of each of the sensor devices to the alert. For example, the means for processing the portion of the feature data may include the alert management device 102, the transceiver 118, the one or more processors 112, the feature importance analyzer 182, one or more devices or components configured to process the feature data to generate feature importance data for the alert, or any combination thereof.

The first apparatus also includes means for identifying one or more historical alerts that are most similar, based on the feature importance data and stored feature importance data, to the alert. For example, the means for identifying the one or more historical alerts may include the alert management device 102, the transceiver 118, the one or more processors 112, the historical alert identifier 184, one or more devices or components configured to identify one or more historical alerts that are most similar, based on the feature importance data and stored feature importance data, to the alert, or any combination thereof.

In conjunction with the described devices and techniques, a second apparatus for identifying a historical alert that is similar to an alert associated with a detected deviation from an operational state of a device, is described.

The second apparatus includes means for receiving feature data including time series data for multiple sensor devices associated with the device. For example, the means for receiving the feature data may include the alert management device 102, the transceiver 118, the one or more processors 112, the alert generator 180, the feature importance analyzer 182, one or more devices or components configured to receive the feature data, or any combination thereof.

The second apparatus includes means for receiving an alert indicator for the alert. For example, the means for receiving the alert indicator may include the alert management device 102, the transceiver 118, the one or more processors 112, the feature importance analyzer 182, one or more devices or components configured to receive the alert indicator, or any combination thereof.

The second apparatus includes means for processing a portion of the feature data that is within a temporal window associated with the alert indicator to generate feature importance data for the alert, the feature importance data including values indicating relative importance of each of the sensor devices to the alert. For example, the means for processing the portion of the feature data may include the alert management device 102, the transceiver 118, the one or more processors 112, the feature importance analyzer 182, one or more devices or components configured to process the feature data to generate feature importance data for the alert, or any combination thereof.

The second apparatus also includes means for identifying one or more historical alerts that are most similar to the alert based on feature-by-feature processing of the values in the feature importance data with corresponding values in the stored feature importance data. For example, the means for identifying the one or more historical alerts that are most similar to the alert based on feature-by-feature processing may include the alert management device 102, the transceiver 118, the one or more processors 112, the historical alert identifier 184, one or more devices or components configured to identify one or more historical alerts that are most similar to the alert based on feature-by-feature processing, based on the feature importance data and stored feature importance data, to the alert, or any combination thereof.

Particular aspects of the disclosure are described below in the following clauses:

According to a clause 1, a method of identifying a historical alert that is similar to an alert associated with a detected deviation from an operational state of a device, the method comprising: receiving feature data including time series data for multiple sensor devices associated with the device; receiving an alert indicator for the alert; processing a portion of the feature data that is within a temporal window associated with the alert indicator to generate feature importance data for the alert, the feature importance data including values indicating relative importance of each of the sensor devices to the alert; and identifying one or more historical alerts that are most similar, based on the feature importance data and stored feature importance data, to the alert.

Clause 2 includes the method of clause 1, wherein identifying the one or more historical alerts is based on feature-by-feature processing of the values in the feature importance data with corresponding values in the stored feature importance data.

Clause 3 includes the method of clause 1, wherein identifying the one or more historical alerts is based on comparing a list of features having largest relative importance to the alert to lists of features having largest relative importance to the historical alerts.

Clause 4 includes the method of clause 1, further comprising generating an output indicating the identified one or more historical alerts.

Clause 5 includes the method of clause 4, wherein each of the historical alerts includes a label, and wherein generating the output includes displaying, for each of the identified one or more historical alerts, the label associated with that historical alert.

Clause 6 includes the method of clause 4, further comprising displaying, for each of the identified one or more historical alerts, at least one diagnostic action or remedial action associated with that historical alert.

Clause 7 includes the method of clause 1, wherein at least one of the historical alerts corresponds to a previous alert for the device.

Clause 8 includes the method of clause 1, wherein at least one of the historical alerts corresponds to an alert for a second device.

Clause 9 includes the method of clause 1, further comprising selecting, based on the identified one or more historical alerts, a control device to send a control signal to.

Clause 10 includes the method of clause 1, wherein each feature of the feature data corresponds to the time series data for a corresponding sensor device of the multiple sensor devices, wherein the alert is generated responsive to anomalous behavior of one or more of the features, and wherein processing the portion of the feature data includes: determining, for each of the features, a feature importance value indicating the contribution of that feature to generation of the alert for each time interval within the temporal window; and processing, for each of the features, the feature importance values of that feature to generate an average feature importance value for that feature, and wherein the feature importance data includes, for each of the features, the average feature importance value for that feature.

Clause 11 includes the method of clause 1, wherein identifying the one or more historical alerts includes: determining, for each of the historical alerts, a similarity value based on feature-by-feature processing of the values in the feature importance data with corresponding values in the stored feature importance data corresponding to that historical alert; identifying one or more of the similarity values that indicate largest similarity of the similarity values; and selecting the one or more historical alerts corresponding to the identified one or more of the similarity values.

Clause 12 includes the method of clause 11, wherein the similarity value corresponds to a cosine similarity.

Clause 13 includes the method of clause 12, wherein determining the similarity value includes, for each feature of the feature data, selectively adjusting a sign of a feature importance value for that feature based on whether a value of that feature within the temporal window exceeds a historical mean value for that feature.

Clause 14 includes the method of clause 1, wherein identifying the one or more historical alerts includes, for each of the historical alerts: determining a first set of features providing the largest contributions to generation of that historical alert; combining the first set of features with a set of features providing the largest contributions to generation of the alert to identify a subset of features; and determining, for the subset of features, a similarity value based on feature-by-feature processing of the values in the feature importance data with corresponding values in the stored feature importance data corresponding to that historical alert.

Clause 15 includes the method of clause 1, wherein each feature of the feature data corresponds to the time series data for a corresponding sensor device of the multiple sensor devices, wherein the alert is generated responsive to anomalous behavior of one or more of the features, and wherein identifying the one or more historical alerts includes generating, based on the feature importance data, a ranking of the features for the alert according to a contribution of each feature to generation of the alert. The method includes, for each of the historical alerts: generating, based on the stored feature importance data for that historical alert, a ranking of features for that historical alert according to the contribution of each feature to generation of that historical alert; and determining a similarity value for that historical alert indicating how closely a list of highest-ranked features for the alert matches a list of highest-ranked features for that historical alert. The method also includes identifying one or more of the similarity values that indicate largest similarity of the determined similarity values; and selecting the one or more historical alerts corresponding to the identified one or more of the similarity values.

Clause 16 includes the method of clause 1, further comprising generating a graphical user interface including: a graph indicative of a performance metric of the device over time; a graphical indication of the alert corresponding to a portion of the graph; and an indication of one or more sets of the feature data associated with the alert.

Clause 17 includes the method of clause 1, further comprising identifying at least one diagnostic action or remedial action for the alert based on the one or more historical alerts that are most similar to the alert.

According to a clause 18, a system to identify a historical alert that is similar to an alert associated with a detected deviation from an operational state of a device, the system comprising: a memory including stored feature importance data for historical alerts; and one or more processors coupled to the memory. The one or more processors are configured to: receive feature data including time series data for multiple sensor devices associated with the device; receive an alert indicator for the alert; process a portion of the feature data that is within a temporal window associated with the alert indicator to generate feature importance data for the alert, the feature importance data including values indicating relative importance of each of the sensor devices to the alert; and identify one or more of the historical alerts that are most similar, based on the feature importance data and the stored feature importance data, to the alert.

Clause 19 includes the system of clause 18, further comprising a display interface coupled to the one or more processors and configured to provide a graphical user interface to a display device, wherein the graphical user interface includes a label, an indication of a diagnostic action, an indication of a remedial action, or a combination thereof, associated with each of the identified one or more historical alerts.

Clause 20 includes the system of clause 18, wherein the one or more processors are further configured to, for each of the historical alerts: determine a first set of features providing the largest contributions to generation of that historical alert; combine the first set of features with a set of features providing the largest contributions to generation of the alert to identify a subset of features; and determine, for the subset of features, a similarity value based on feature-by-feature processing of the values in the feature importance data with corresponding values in the stored feature importance data corresponding to that historical alert.

According to a clause 21, a computer-readable storage device storing instructions that, when executed by one or more processors, cause the one or more processors to: receive feature data including time series data for multiple sensor devices associated with a device; receive an alert indicator for an alert associated with a detected deviation from an operational state of the device; process a portion of the feature data that is within a temporal window associated with the alert indicator to generate feature importance data for the alert, the feature importance data including values indicating relative importance of each of the sensor devices to the alert; and identify one or more historical alerts that are most similar, based on the feature importance data and stored feature importance data, to the alert.

According to a clause 22, a method of identifying a historical alert that is similar to an alert associated with a detected deviation from an operational state of a device, the method comprising: receiving feature data including time series data for multiple sensor devices associated with the device; receiving an alert indicator for the alert; processing a portion of the feature data that is within a temporal window associated with the alert indicator to generate feature importance data for the alert, the feature importance data including values indicating relative importance of each of the sensor devices to the alert; and identifying one or more historical alerts that are most similar to the alert based on feature-by-feature processing of the values in the feature importance data with corresponding values in the stored feature importance data.

Clause 23 includes the method of clause 22, further comprising generating an output indicating the identified one or more historical alerts.

Clause 24 includes the method of clause 23, wherein each of the historical alerts includes a label, and wherein generating the output includes displaying, for each of the identified one or more historical alerts, the label associated with that historical alert.

Clause 25 includes the method of clause 23, further comprising displaying, for each of the identified one or more historical alerts, at least one diagnostic action or remedial action associated with that historical alert.

Clause 26 includes the method of clause 22, wherein at least one of the historical alerts corresponds to a previous alert for the device.

Clause 27 includes the method of clause 22, wherein at least one of the historical alerts corresponds to an alert for a second device.

Clause 28 includes the method of clause 22, further comprising selecting, based on the identified one or more historical alerts, a control device to send a control signal to.

Clause 29 includes the method of clause 22, wherein each feature of the feature data corresponds to the time series data for a corresponding sensor device of the multiple sensor devices, wherein the alert is generated responsive to anomalous behavior of one or more of the features, and wherein processing the portion of the feature data includes: determining, for each of the features, a feature importance value indicating a contribution of that feature to generation of the alert for each time interval within the temporal window; and processing, for each of the features, the feature importance values of that feature to generate an average feature importance value for that feature, and wherein the feature importance data includes, for each of the features, the average feature importance value for that feature.

Clause 30 includes the method of clause 22, wherein identifying the one or more historical alerts includes: determining, for each of the historical alerts, a similarity value based on feature-by-feature processing of the values in the feature importance data with corresponding values in the stored feature importance data corresponding to that historical alert; identifying one or more of the similarity values that indicate largest similarity of the similarity values; and selecting the one or more historical alerts corresponding to the identified one or more of the similarity values.

Clause 31 includes the method of clause 30, wherein the similarity value corresponds to a cosine similarity.

Clause 32 includes the method of clause 31, wherein determining the similarity value includes, for each feature of the feature data, selectively adjusting a sign of a feature importance value for that feature based on whether a value of that feature within the temporal window exceeds a historical mean value for that feature.

Clause 33 includes the method of clause 30, wherein identifying the one or more historical alerts includes, for each of the historical alerts: determining a first set of features providing the largest contributions to generation of that historical alert; combining the first set of features with a set of features providing the largest contributions to generation of the alert to identify a subset of features; and determining, for the subset of features, a similarity value based on feature-by-feature processing of the values in the feature importance data with corresponding values in the stored feature importance data corresponding to that historical alert.

Clause 34 includes the method of clause 22, further comprising generating a graphical user interface including: a graph indicative of a performance metric of the device over time; a graphical indication of the alert corresponding to a portion of the graph; and an indication of one or more sets of the feature data associated with the alert.

Clause 35 includes the method of clause 22, further comprising identifying at least one diagnostic action or remedial action for the alert based on the one or more historical alerts that are most similar to the alert.

According to a clause 36, a system to identify a historical alert that is similar to an alert associated with a detected deviation from an operational state of a device, the system comprising: a memory including stored feature importance data for historical alerts; and one or more processors coupled to the memory. The one or more processors are configured to: receive feature data including time series data for multiple sensor devices associated with the device; receive an alert indicator for the alert; process a portion of the feature data that is within a temporal window associated with the alert indicator to generate feature importance data for the alert, the feature importance data including values indicating relative importance of each of the sensor devices to the alert; and identify one or more of the historical alerts that are most similar to the alert based on feature-by-feature processing of the values in the feature importance data with corresponding values in the stored feature importance data.

Clause 37 includes the system of clause 36, further comprising a display interface coupled to the one or more processors and configured to provide a graphical user interface to a display device, wherein the graphical user interface includes a label, an indication of a diagnostic action, an indication of a remedial action, or a combination thereof, associated with each of the identified one or more historical alerts.

Clause 38 includes the system of clause 36, wherein the one or more processors are further configured to, for each of the historical alerts: determine a first set of features providing the largest contributions to generation of that historical alert; combine the first set of features with a set of features providing the largest contributions to generation of the alert to identify a subset of features; and determine, for the subset of features, a similarity value based on feature-by-feature processing of the values in the feature importance data with corresponding values in the stored feature importance data corresponding to that historical alert.

According to a clause 39, a computer-readable storage device storing instructions that, when executed by one or more processors, cause the one or more processors to: receive feature data including time series data for multiple sensor devices associated with a device; receive an alert indicator for an alert associated with a detected deviation from an operational state of the device; process a portion of the feature data that is within a temporal window associated with the alert indicator to generate feature importance data for the alert, the feature importance data including values indicating relative importance of each of the sensor devices to the alert; and identify one or more historical alerts that are most similar to the alert based on feature-by-feature processing of the values in the feature importance data with corresponding values in the stored feature importance data.

Although the disclosure may include one or more methods, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A method of identifying a historical alert that is similar to an alert associated with a detected deviation from an operational state of a device, the method comprising:
   receiving feature data including time series data for multiple sensor devices associated with the device;
   receiving an alert indicator for the alert;
   processing a portion of the feature data that is within a temporal window associated with the alert indicator to generate feature importance data for the alert, the feature importance data including values indicating relative importance of each of the sensor devices to the alert;
   selectively adjusting a sign of a feature importance value for each of one or more features of the feature data based on whether a value of that feature within the temporal window exceeds a historical mean value for that feature;
   determining, for each of multiple historical alerts, a similarity value based on the values in the feature importance data and corresponding values in stored feature importance data corresponding to that historical alert; and
   identifying, based on one or more of the similarity values that indicate largest similarity of the similarity values, one or more historical alerts that are most similar to the alert.

2. The method of claim 1, wherein identifying the one or more historical alerts is based on feature-by-feature processing of the values in the feature importance data with corresponding values in the stored feature importance data.

3. The method of claim 1, wherein identifying the one or more historical alerts is based on comparing a list of features having largest relative importance to the alert to lists of features having largest relative importance to the historical alerts.

4. The method of claim 1, further comprising generating an output indicating the identified one or more historical alerts.

5. The method of claim 4, wherein each of the historical alerts includes a label, and wherein generating the output includes displaying, for each of the identified one or more historical alerts, the label associated with that historical alert.

6. The method of claim 4, further comprising displaying, for each of the identified one or more historical alerts, at least one diagnostic action or remedial action associated with that historical alert.

7. The method of claim 1, wherein at least one of the historical alerts corresponds to a previous alert for the device.

8. The method of claim 1, wherein at least one of the historical alerts corresponds to an alert for a second device.

9. The method of claim 1, further comprising selecting, based on the identified one or more historical alerts, a control device to send a control signal to.

10. The method of claim 1, wherein each feature of the feature data corresponds to the time series data for a corresponding sensor device of the multiple sensor devices, wherein the alert is generated responsive to anomalous behavior of one or more of the features, and wherein processing the portion of the feature data includes:
    determining, for each of the features, a feature importance value indicating the contribution of that feature to generation of the alert for each time interval within the temporal window; and
    processing, for each of the features, the feature importance values of that feature to generate an average feature importance value for that feature, and
    wherein the feature importance data includes, for each of the features, the average feature importance value for that feature.

11. The method of claim 1, wherein determining the similarity value for each of the multiple historical alerts is based on feature-by-feature processing of values in the feature importance data with corresponding values in the stored feature importance data corresponding to that historical alert.

12. The method of claim 1, wherein the similarity value corresponds to a cosine similarity.

13. The method of claim 1, wherein determining the similarity value for a particular historical alert includes, for each feature of the feature data, performing feature-by-feature processing of the feature importance value of that feature with a corresponding value in the stored feature importance data corresponding to the particular historical alert.

14. The method of claim 1, wherein determining the similarity value for each of the multiple historical alerts includes:
    determining a first set of features providing the largest contributions to generation of that historical alert;
    combining the first set of features with a set of features providing the largest contributions to generation of the alert to identify a subset of features; and
    generating the similarity value for that historical alert based on feature-by-feature processing of the values corresponding to the subset of features in the feature importance data with corresponding values in the stored feature importance data corresponding to that historical alert.

15. The method of claim 1, wherein each feature of the feature data corresponds to the time series data for a corresponding sensor device of the multiple sensor devices, and wherein the alert is generated responsive to anomalous behavior of one or more of the features.

16. The method of claim 1, further comprising generating a graphical user interface including:
    a graph indicative of a performance metric of the device over time;
    a graphical indication of the alert corresponding to a portion of the graph; and
    an indication of one or more sets of the feature data associated with the alert.

17. The method of claim 1, further comprising identifying at least one diagnostic action or remedial action for the alert based on the one or more historical alerts that are most similar to the alert.

18. A system to identify a historical alert that is similar to an alert associated with a detected deviation from an operational state of a device, the system comprising:
- a memory including stored feature importance data for historical alerts; and
- one or more processors coupled to the memory, the one or more processors configured to:
  - receive feature data including time series data for multiple sensor devices associated with the device;
  - receive an alert indicator for the alert;
  - process a portion of the feature data that is within a temporal window associated with the alert indicator to generate feature importance data for the alert, the feature importance data including values indicating relative importance of each of the sensor devices to the alert;
  - selectively adjust a sign of a feature importance value for each of one or more features of the feature data based on whether a value of that feature within the temporal window exceeds a historical mean value for that feature;
  - determine, for each of the historical alerts, a similarity value based on the values in the feature importance data and corresponding values in the stored feature importance data corresponding to that historical alert; and
  - identify, based on one or more of the similarity values that indicate largest similarity of the similarity values, one or more of the historical alerts that are most similar to the alert.

19. The system of claim 18, further comprising a display interface coupled to the one or more processors and configured to provide a graphical user interface to a display device, wherein the graphical user interface includes a label, an indication of a diagnostic action, an indication of a remedial action, or a combination thereof, associated with each of the identified one or more historical alerts.

20. The system of claim 18, wherein the one or more processors are further configured to, for each of the historical alerts:
- determine a first set of features providing the largest contributions to generation of that historical alert;
- combine the first set of features with a set of features providing the largest contributions to generation of the alert to identify a subset of features; and
- generate the similarity value for that historical alert based on feature-by-feature processing of the values in the feature importance data that correspond to the subset of features with corresponding values in the stored feature importance data corresponding to that historical alert.

21. A non-transitory computer-readable storage device storing instructions that, when executed by one or more processors, cause the one or more processors to:
- receive feature data including time series data for multiple sensor devices associated with a device;
- receive an alert indicator for an alert associated with a detected deviation from an operational state of the device;
- process a portion of the feature data that is within a temporal window associated with the alert indicator to generate feature importance data for the alert, the feature importance data including values indicating relative importance of each of the sensor devices to the alert;
- selectively adjust a sign of a feature importance value for each of one or more features of the feature data based on whether a value of that feature within the temporal window exceeds a historical mean value for that feature;
- determine, for each of multiple historical alerts, a similarity value based on the values in the feature importance data and corresponding values in stored feature importance data corresponding to that historical alert; and
- identify, based on one or more of the similarity values that indicate largest similarity of the similarity values, one or more historical alerts that are most similar to the alert.

* * * * *